United States Patent
Matraszek et al.

[11] Patent Number: 5,875,040
[45] Date of Patent: Feb. 23, 1999

[54] GRADIENT BASED METHOD FOR PROVIDING VALUES FOR UNKNOWN PIXELS IN A DIGITAL IMAGE

[75] Inventors: Tomasz Andrzej Matraszek, Pittsford; David Roy Cok; Robert Terry Gray, both of Rochester, all of N.Y.

[73] Assignee: Eastman Kodak Company, Rochester, N.Y.

[21] Appl. No.: 566,544

[22] Filed: Dec. 4, 1995

[51] Int. Cl.$^6$ .............................. H04N 1/387; H04N 1/41; H04N 1/40; G06K 9/46
[52] U.S. Cl. ........................ 358/453; 358/428; 358/447; 382/195; 382/199
[58] Field of Search ..................................... 382/203, 199, 382/205, 254, 190, 195; 358/453, 428, 447

[56] References Cited

U.S. PATENT DOCUMENTS

| | | | |
|---|---|---|---|
| 4,489,104 | 12/1984 | Lee | 427/101 |
| 4,630,307 | 12/1986 | Cok | 382/25 |
| 4,642,676 | 2/1987 | Weinger | 358/22 |
| 4,941,186 | 7/1990 | Massmann et al. | 382/54 |
| 5,097,521 | 3/1992 | Massmann | 382/54 |
| 5,153,748 | 10/1992 | Moyer | 358/443 |
| 5,231,680 | 7/1993 | Williams | 382/54 |
| 5,365,604 | 11/1994 | Kwok et al. | 382/54 |
| 5,373,322 | 12/1994 | Laroche et al. | 348/273 |

*Primary Examiner*—Kim Yen Vu
*Assistant Examiner*—Kimberly A. Williams
*Attorney, Agent, or Firm*—Gordon M. Stewart

[57] ABSTRACT

A method of correcting one or more defect pixels in a defect region of a source image, which image has both the defect pixels and non-defect pixels each of which is represented by at least one defect pixel signal and non-defect pixel signal, respectively. The method comprises:
  a) searching for edges in a non-defect region of the image adjacent to the defect region by: (i) comparing relative pixel parameters in the non-defect region with a predetermined tolerance to locate a sequence of pixels representing an edge segment the members of which have relative parameters within the tolerance and which sequence is within a predetermined distance of the defect region; and (ii) comparing the length of an edge segment with a minimum length to identify as an edge a segment with at least the minimum length;
  b) generating at least one pixel signal for the defect region based on the signal of at least one non-defect pixel lying in a direction from the defect pixel which is determined by the direction of an edge.

An apparatus for performing the method and a computer usable medium containing computer code for performing the method, are also provided.

41 Claims, 20 Drawing Sheets

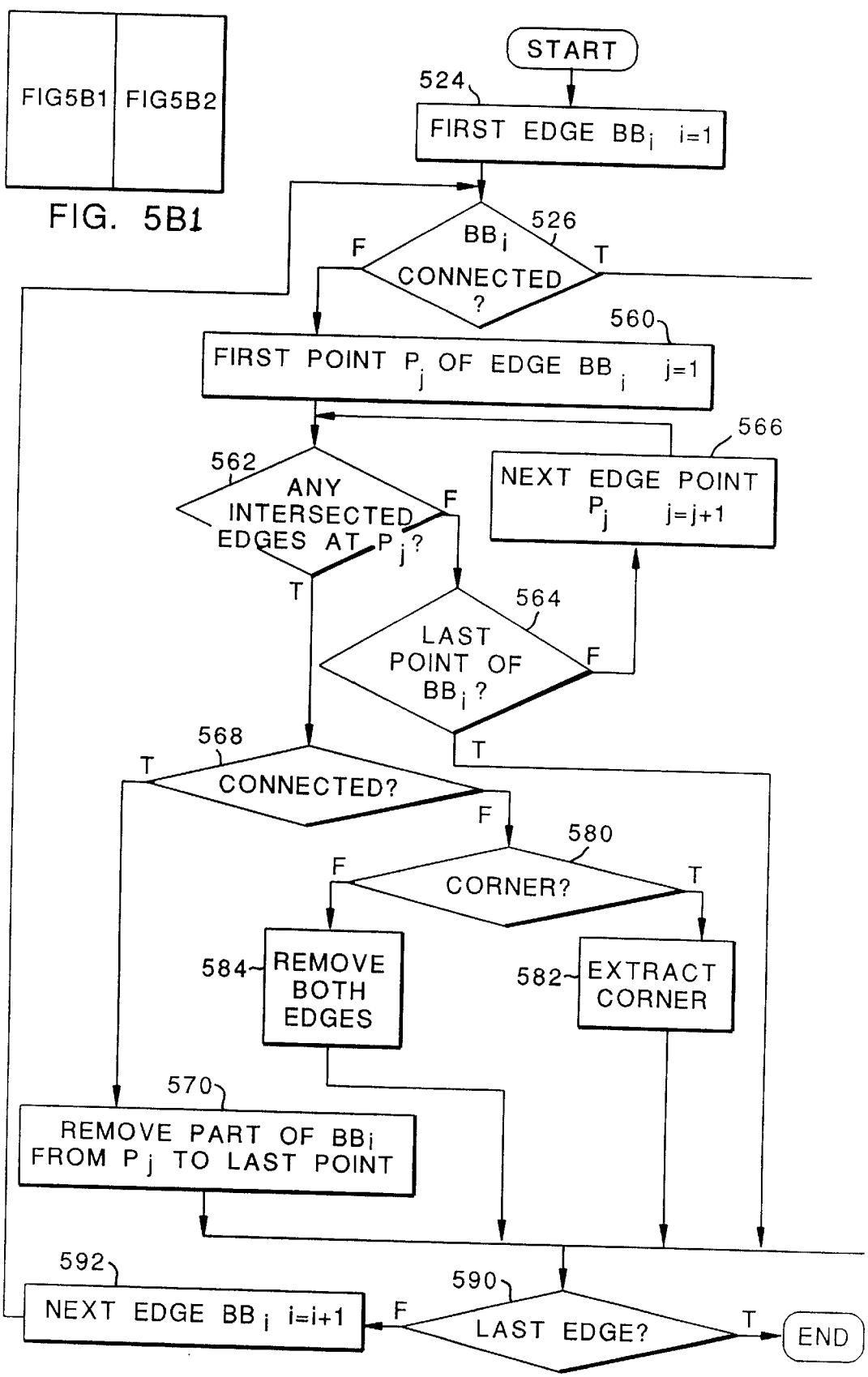
FIG. 5B1

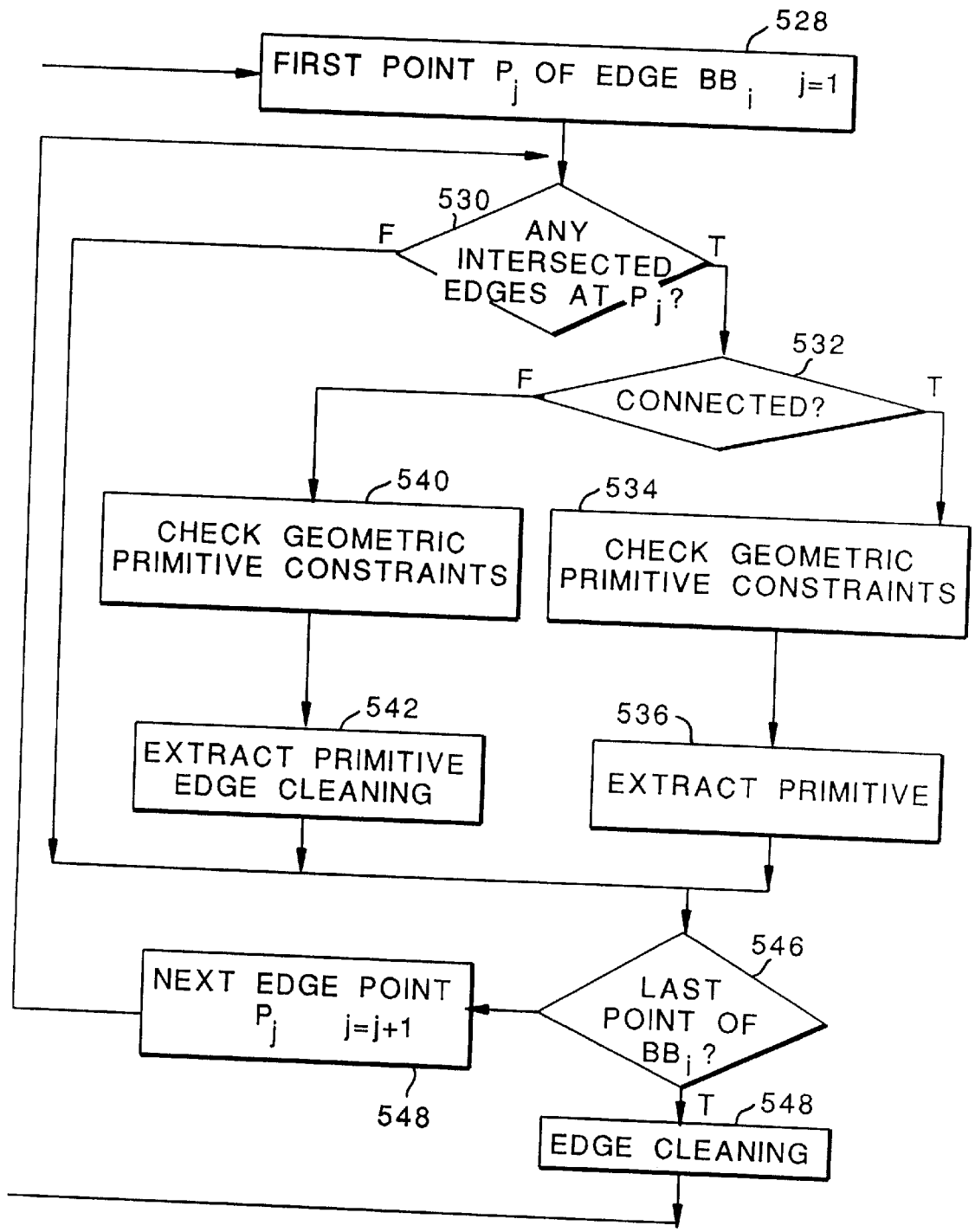
FIG. 5B2

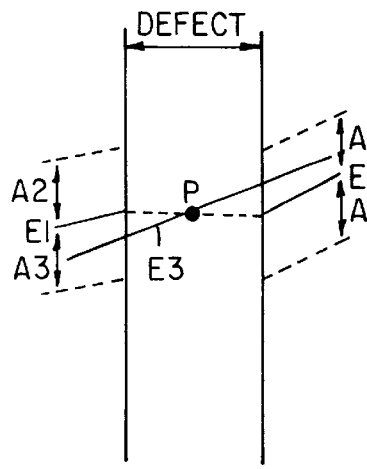
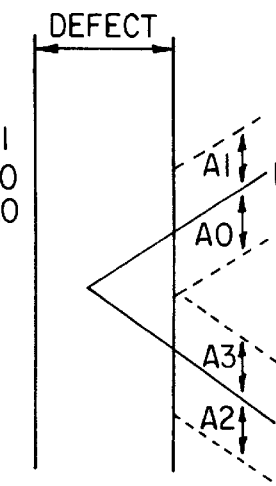
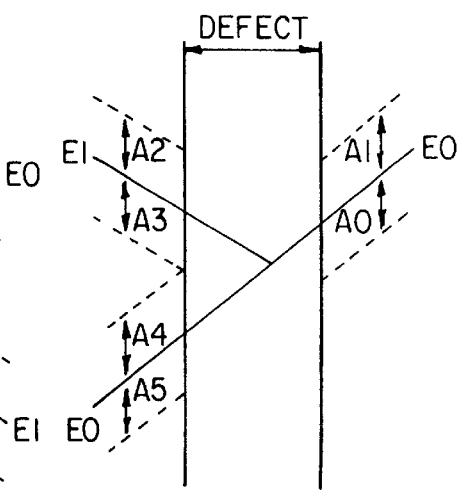
FIG. 6a  FIG. 6b  FIG. 6c
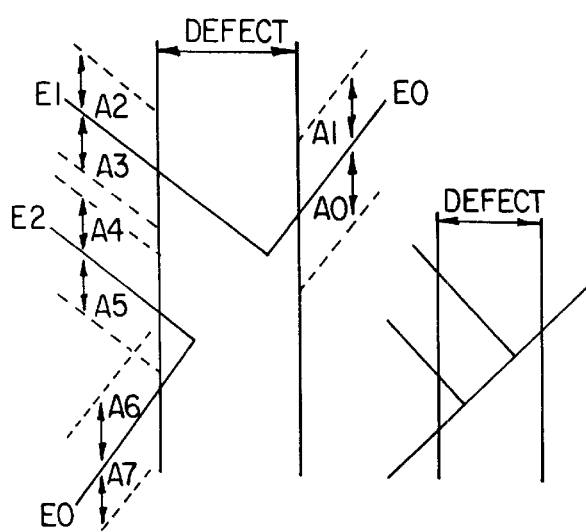
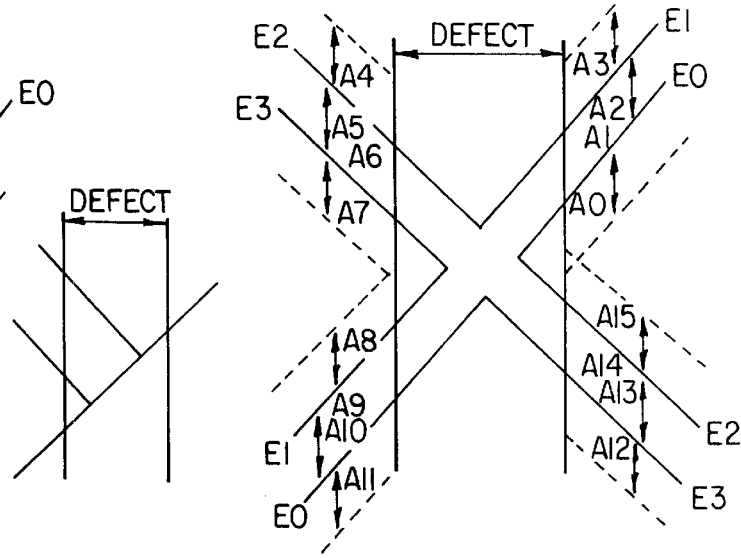
FIG. 6d  FIG. 6e  FIG. 6f

GRADIENT BASED METHOD FOR PROVIDING VALUES FOR UNKNOWN PIXELS IN A DIGITAL IMAGE

FIELD OF THE INVENTION

This invention relates to a method, and apparatus for performing the method of correcting one or more defect pixels in a defect region of a digital image signal representing a source image.

BACKGROUND OF THE INVENTION

Conversion of analog images into digital data has become widespread for a variety of applications, including storing, manipulating, transmitting and displaying or printing copies of the images. For example, sequences of frames from a motion picture film are often digitized, image enhancement or special effects are performed on the digitized images and the result written onto a blank film. Also, images captured on photographic media are being converted to digital data and stored on compact discs for readout and display as a video image or for printing with various types of color printers. In order to capture the photographic image digitally, the film frame is scanned with a light beam, and the light transmitted through the film is detected, typically as three primary color light intensity signals, and digitized. The digitized values may be formatted to a standard for video display and stored on compact disc or magnetic media. Such film digitizers take a variety of forms and the various common aspects of film digitizing, particularly line illumination and linear CCD-based digitizers, are described in greater detail in commonly assigned U.S. Pat. No. 5,012,346. Also photographic prints can be digitized using reflection scanners.

Providing new pixel values for corrupted or defect pixels is a common operation in digital image processing. Part of the image can be damaged by scratches or degraded by dust. Corrupted pixel values do not represent original image information and hence these values cannot be used for restoration purposes. New pixel values must be supplied consistent with the image content surrounding the area to be replaced. This process is referred to here as a pixelfill. Another example of an image processing operation requiring pixelfill is an object removal from the image, for example rig and wire removal in motion pictures.

Simple nondirectional averaging or erosion techniques are usually used to fill small, compact defect regions in a film frame. These methods produce undesired smoothness in the replaced regions and severely distort edges that are intersected by the regions to be filled. The problem of reconstructing edges is especially important for long, narrow regions to be filled due to the high probability they intersect multiple objects in the image. This problem is addressed in the method described by massmann et al. in U.S. Pat. No. 5,097,521. The above method has some disadvantages. First, it assumes essentially vertical regions to be filled. It may also not handle well the situation where multiple edges intersect in the defect region.

Kwok et al. in U.S. Pat. No. 5,097,521 disclose an error concealment system based on the gradient field. In this system a two dimensional block of defect data is filled. This system may not handle well the case where objects crossing the defect block have a width much smaller than the size of the defect block.

Previous methods can produce artifacts when curved edges, object corners or "T-type" edge intersections are covered by the defect region.

It would be desirable then, to have a method of providing corrected pixel values for pixels in a defect region, which can produce reconstructed image content in the defect region which is fairly consistent with the image content of the surrounding area, even in the case where the defect region intersects objects with a width smaller than, or comparable to, the width of the defect region or where multiple edges intersect in the defect region.

SUMMARY OF THE INVENTION

The present invention then, provides a method of correcting one or more defect pixels in a defect region of a source image. The source image has both defect pixels and non-defect pixels each of which is represented by at least one defect pixel signal and non-defect pixel signal, respectively. The invention assumes the presence of an input digital image along with an indication of defect regions, such as a mask image. Pixels of a given value (e.g. equal 0) in the mask image define defect pixels in the input image. In one aspect, the method comprises:

a) searching a non-defect region of the image adjacent to the defect region for sequences of pixels representing edge segments by: (i) comparing relative pixel parameters in the non-defect region with a predetermined tolerance to locate a sequence of pixels representing an edge segment, the members of which have relative parameters within the tolerance and which sequence is within a predetermined distance of the defect region; and (ii) comparing the length of an edge segment with a minimum length to identify as an edge a segment with at least the minimum length;

b) generating at least one pixel signal for the defect region based on the signal of at least one non-defect pixel lying in a direction from the defect pixel which is determined by the direction of an edge.

The method of the present invention particularly lends itself to implementation on a computer, preferably a programmable digital computer. The necessary calculations (e.g. generating gradients, comparing lengths, generating pixel signals) described below can be performed by the computer's processor, while anything requiring storage can be stored in a storage device (e.g. RAM or disk) in the computer.

The relative pixel parameters used for detecting edges will generally include a parameter which directly defines an edge shape. For example, an edge directional angle can be used as the parameter, where the edge directional angle of a pixel is taken as being perpendicular to the gradient direction at that pixel. One way of locating edges is to select the non-defect region as a "sliding" window of limited dimensions adjacent to the defect region, which window defines a local non-defect region. An edge in that window can then be located using a gradient field, as described in more detail below. It will be noted that by "adjacent" does not necessarily mean immediately adjacent in that there may be some preselected distance separating the center of the window or end of an edge from the defect area. In particular, as described below, a defect extension distance due to blur and gradient operations, separates the center of the sliding window from the defect region.

Only the directional attribute of pixel gradients may be compared (although preferably both directional angle and magnitude are used). The method will locate a sequence of pixels which extends in at least one direction from the start pixel (and including the start pixel itself), the members of the located sequence having relative gradient attributes at least one of which attributes is within a predetermined tolerance and which sequence is within a predetermined distance of the defect region. The length of an edge segment is compared with a minimum length and, if the minimum length is met, the segment is classified as an edge. The window can then be moved, as described in more detail below and the process repeated so that an entire area adjacent to and about the non-defect region has been searched for edges by means of searching such local non-defect regions in sequence.

Using the sliding window method as described, an area adjacent to and around the defect region can be treated as a plurality of local non-defect regions. However, non-defect regions adjacent to and around the defect region could be searched for edges in a similar manner without necessarily using the preferred sliding window method.

Pixel signals for the defect region can be generated based on the edge that extends into the defect region. In this case, a model of edge shape would be determined which would then be used to predict the shape of the edge extended into the defect region. For example, for a curved edge a model of the curvature could be developed (for example, an equation representing the curvature) which is used to predict the location of the curve in the defect region. Values of pixels on the defect portion of the edge could then be generated for the predicted defect portion of the edge based on the signals of at least some of the pixels of the edge (such as by nearest neighbor or other extrapolation or interpolation techniques). Values for other pixels in the defect region not lying on an edge (which will typically be within a predetermined distance of an edge) can also be generated based on the signal of at least one non-defect pixel lying in a direction from the defect pixel which is determined by the direction of an edge.

However, in one embodiment of the present invention pixel signals for the defect region may be generated when two edges are found in the local neighborhood of the defect region. In this case, pixel parameters of the ends of those edges adjacent to the defect region are compared with at least one predetermined tolerance (a predetermined tolerance for both gradient magnitude and gradient directional angle can be used). For example, the gradient magnitude and the local gradient directional angle of the pixels of the ends can be compared with a predetermined acceptable magnitude variation and relative angle range. In this case a model of edge shape would be determined which would then be used to predict the shape of the edge segment that connects two edges in the defect region. For example, an edge segment connecting two edges in the defect region can be modeled by a non-linear function to represent a curvature. Pixel signals can then be generated for defect region pixels on the location of an edge segment connecting the two ends in the defect region. The generated signals are based on at least one pixel signal of the two detected edges. In this regard, pixel signals may be generated for some or all of the pixels of the edge segment connecting two edges through the defect region. Values for other pixels in the defect region not lying on the edge segment connecting two edges (which will typically be within a predetermined distance of the edge segment) can also be generated based on the signal of at least one non-defect pixel lying in a direction from the defect pixel which is determined by the direction of at least one edge and/or the edge segment connecting the two edges.

It will be appreciated that in the preceding embodiment, it is not necessary that the two edges are both first identified. For example, one edge could be first identified by using gradient field as described. Then, the location of a line which extends from the edge and through the defect region, is determined. This location can be based on the direction of at least a portion of the edge (such as the end of the edge adjacent to the defect region). Then a non-defect region adjacent to the defect area and opposite the edge, is searched for a sequence of pixels representing an edge segment extending from a first non-defect pixel intersected by the line extension of the edge through the defect region. This can be done in a manner already described by comparing the difference in pixel parameters (such as edge directional angles of the pixels) with the predetermined tolerance.

It will be appreciated that in the method of the present invention, additional tests can be applied to decide when an edge (typically a connected edge, as described below) is found. For example, a parameter representative of pixel signals in a region adjacent to at least a first side of one of the edges, can be compared with the same parameter representative of pixel signals in a region adjacent to a corresponding first side of the other edge. Preferably the parameter for pixel signals in a region adjacent to a corresponding second side of both edges is also tested against the predetermined tolerance and must fall within it, before pixel signals are generated between the two ends. Such a parameter can, for example, represent average pixel values for each color channel (such as RGB, CMY, monochrome and the like) in the compared regions. In this case, this additional test can be regarded as a color match constraint to be met by the edges. Variance of the pixel values for each region can also be included in the parameter. As to which sides are "corresponding" sides, this will depend on the complexity of shapes formed by multiple edges which are to be handled by the method. For example, where the method is to handle single edges which may traverse the defect region (i.e. single line case), "corresponding" sides would be the sides facing in the same direction perpendicular to the edge. If the method is to handle other or more complex shapes formed by edges, the corresponding sides would depend on the type of shape to be handled (examples of these are provided below).

In the preferred implementation of the present invention, the method comprises searching a non-defect region adjacent to the defect region, for edge segments, using the methods (preferably gradient based) already described or any other suitable method, and comparing the length of edge segments with a predetermined minimum length to identify as edges, those segments of at least the minimum length. The locations of these detected edges and relevant information are stored, for example in a computer random access memory (RAM), and define an edge map. This edge map is then searched for geometric primitives. A "geometric primitive" is a model of a preselected arrangement of one or more edges. Examples of geometric primitives includes corners, T-junctions and X-junctions. This searching step may be accomplished by comparing at least one relative geometric parameter of a set of at least two edges with a geometric constraint which corresponds to a geometric primitive. For example, an angle of intersection of two edges can be compared with a constraint corresponding to a range of intersection angles. When the set of edges meets the geometric constraint, plus any other imposed constraint (such as the color match constraint described below), it is considered that a geometric primitive has been detected and the edges of the set meeting the constraints are parts of a "detected" geometric primitive.

A detected geometric primitive can be extracted by extending or reducing (that is, removing portions of an edge), in the map, one or more edges of the detected primitive so that they intersect in the same pattern as defined by the primitive. Alternatively, the primitive can be extracted by replacing, in the map, the edges detected as a primitive with one or more new edges representing the primitive. In the first case, for edges of a detected primitive which intersect the defect region, they will be extended into the defect region typically based on their directions as they enter the defect region. This can be accomplished in different ways. For example, in a preferred way this is accomplished by extending, in the map, all detected edges intersecting the defect region through the defect region. This is followed by removing portions of those edges which are parts of a detected primitive which portions extend beyond intersection points of the edges matching the geometric configuration of the detected primitive. In a second way, this can be accomplished by extending only those edges which are parts of a detected primitive in a way matching the geometric configuration of the detected primitive. For edges of a primitive intersecting outside the defect region, it may be necessary to reduce one or more of them by removing portions extending beyond an intersection point of them.

To avoid long processing times in a computer implementing the present method, it will be apparent that the models of supported geometric primitives will be those arrangements of edges (whether straight, curved or other shapes) considered to most likely be encountered in images to be processed by the present method.

One particular geometric parameter which may be used is the angle of intersection of two edges in the edge map. The corresponding geometric constraint would be an allowable range of intersection angles of two edges. The "intersection angle" is the angle between the directions of two edges at the pixels where they actually intersect (in the case where they intersect outside the defect region) or between their directions at the pixels where they enter the defect region (in the case where the edges do not intersect outside the defect region but their directions intersect inside the defect region). The edge direction at a given point is defined by an average edge directional angle of a selected set of adjacent edge points.

While meeting one or more geometric constraints is a requirement for edges being part of a detected geometric primitive, it may not be the only requirement. It is preferred that an additional constraint of a parameter representative of pixel signals in regions adjacent to one side, preferably two sides, of at least two edges must also be met. Particularly, this would be a color match constraint in the case of color images.

Preferably only those edges in the edge map which are within a predetermined maximum distance of the defect region are searched for geometric primitives.

In the described preferred implementation, signals for defect region pixels are generated each of which is based on the signal of at least one non-defect pixel lying on a predictor line having a direction based on a part of a local detected geometric primitive. The predictor line will generally be parallel to a line representing a part of a detected geometric primitive. In the case of a detected line primitive though, it may be in a direction parallel to a line positioned in the edge map in what is considered the best average position between two edges detected as a line primitive.

Preferably, if there is more than one part of at least one geometric primitive within a predetermined maximum distance of a defect pixel, then estimated pixel signals for the defect pixel are calculated based on at least one non-defect pixel lying on each of the predictor lines passing through the defect pixel, and the final pixel signal is a weighted sum of estimated pixel signals. Each estimated pixel signal is weighted in an inverse relationship to the distance between predictor line and the corresponding geometric primitive part, as further described below.

In an alternative method of the present invention for correcting defect pixels (referred to as a "modified pinwheel method") which are within a predetermined distance of at least one dominant direction of the gradient field, a plurality of line segments through a selected defect pixel are allocated. Each of the line segments is composed of the defect pixel and non-defect pixels about said selected defect pixel. At least one representative model of the non-defect pixel signals is determined along each said line segment. The deviation of the non-defect pixel signals along each said line segment from the model is determined, as is at least one dominant direction of the local (by local is meant within a predetermined distance) gradient field. For a dominant direction there must be a preselected minimum number of pixels with the gradient magnitude above a specified threshold and with gradient directional angles within a predetermined tolerance of this direction. At least one line segment is selected based on a figure of merit. The figure of merit is a value which increases with decreased deviation of the non-defect pixels along the selected line segment, and increases with the alignment of the line segment with the dominant directions of the local gradient field (which may, for example, represent an edge). Figures of merit and their calculation are discussed further below. An estimated pixel signal for the defect pixel is calculated based on at least one non-defect pixel for each selected line segment and the final pixel signal is a weighted sum of estimated pixel signals with weights proportional to figures of merit of the selected line segments.

The modified pinwheel method in a preferred implementation is used as an additional step for obtaining corrected signals for defect pixels which are beyond a threshold distance of any part of a detected geometric primitive or there are no detected geometric primitives. In this implementation the selected line segments do not intersect any detected geometric primitives and the direction of at least one local edge not detected as a part of any geometric primitive is used as the dominant direction of the local gradient field.

The present invention further provides an apparatus for executing the method of the invention. The apparatus is preferably a programmed digital computer with a suitable memory (e.g. RAM, magnetic or optical disk drive, or other suitable storage means) for storing the digital image signal. A computer program product is also provided, which has a computer readable storage medium with executable code for performing each of the steps of the method of the present invention. The computer readable storage medium may comprise, for example: magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium employed to store a computer program.

The present invention then, provides a method and apparatus for providing corrected pixel values for pixels in a defect region of an image signal. The invention can produce reconstructed image content in the defect region which is fairly consistent with the image content of the surrounding area. This is the case even where the defect region intersects objects where the object width is smaller than, or comparable to, the width of the defect region or where multiple edges intersect in the defect region.

BRIEF DESCRIPTION OF THE DRAWINGS

FIGS. 5B1 & 5B2 is a flow chart of the geometric primitive extraction process.

FIGS. 6A–6F is a pictorial representation of geometric primitives.

EMBODIMENTS OF THE INVENTION

Figure 1:
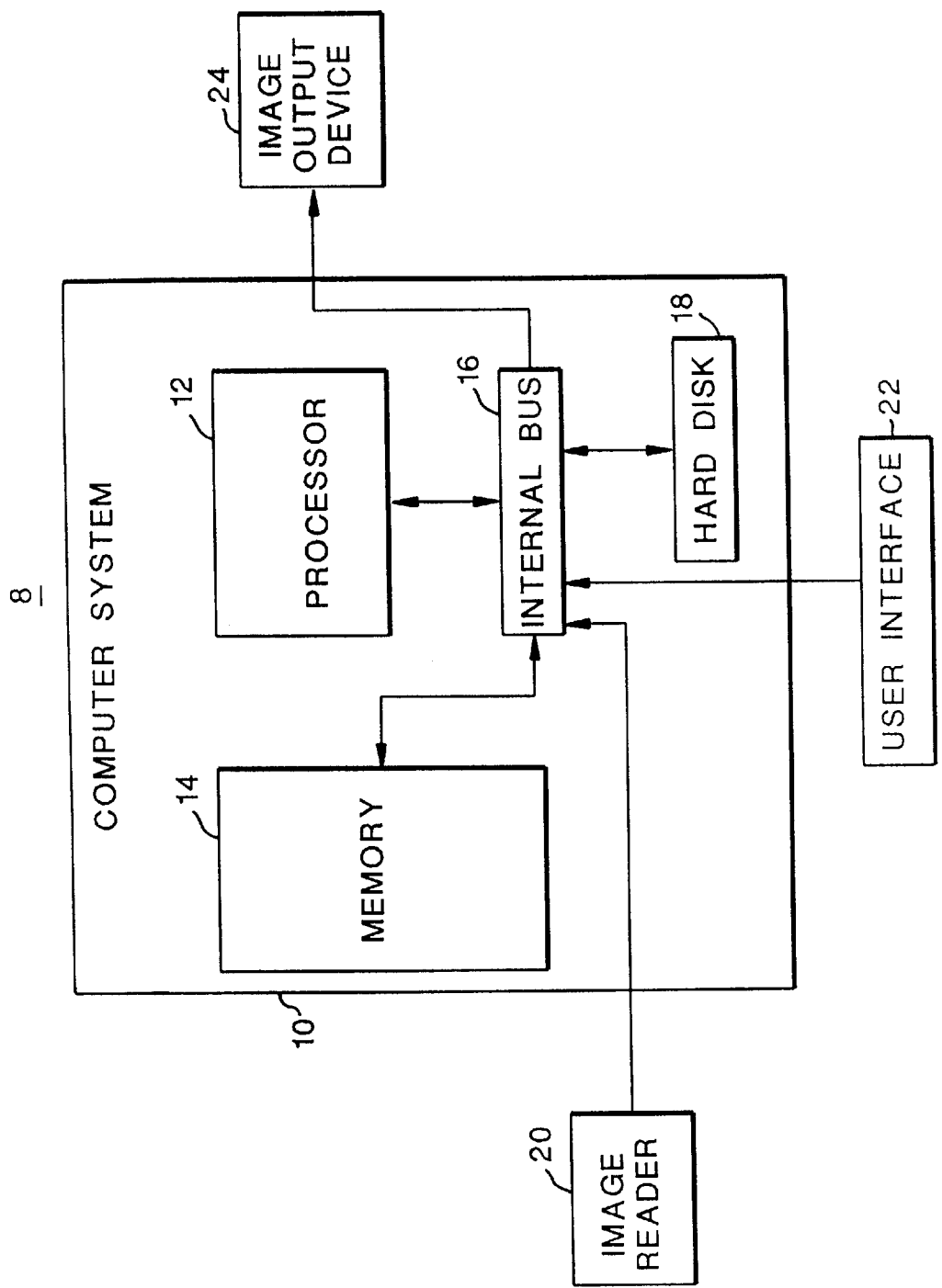
FIG. 1 is a block diagram of an apparatus of the present invention.

An apparatus 8 in accordance with the present invention includes a programmed digital computer system 10 coupled to an image reader 20, an image output device 24, and an user interface 22. Computer system 10 operates according to a set of instructions to correct digital images by providing new values for defect pixels within a defect region in the digital images. With the apparatus and method, defect regions in digital images can be corrected so that regions are entirely unnoticeable to a viewer or less visually discernible because values for defect pixels have been estimated which are consistent with the overall image.

Referring more specifically to FIG. 1, computer system 10 includes a processor 12, a memory 14 and a hard disk 18, which are coupled together with an internal bus 16 for communicating both data and addresses between these components. Preferably, digital images are stored on hard disk 18 in system 10.

Image reader 20 is coupled to computer system 10, and provides a digital image to the computer system 10 via internal bus 16. This digital image is stored in memory 14. In this particular embodiment, image reader 20 is a digital scanner, such as Kodak Professional Photo-CD 4045 Film Scanner, or digital camera, although any type of device for providing a digital image may be used. The digital image captured by reader 20 is the digital representation of any hard copy image such as frames of a motion picture film. Computer system 10 may also receive digital images from other sources, such as digital images stored in hard disk 18. Each digital image is composed of an array of pixel values having one or more color channels.

Image output device 24 is coupled to computer system 10. In this particular embodiment, output device 24 may be any type of digital image output device, such as a video display, a printer, an external non-volatile memory storage device, or a transmission line to other computers within a network. Images stored in memory 14 may be output to image output device 24 through internal bus 16. In the case of source images representing frames from a motion picture, the images following correction by the present apparatus and method can, for example, be printed onto a film.

User interface 22, such as a keyboard or mouse device, is coupled to computer system 10 and allows for a user to control and interact with apparatus 8, such as building of a defect map of the digital image stored in memory 14. User inputs through user interface 22 are described later.

Figure 2A:
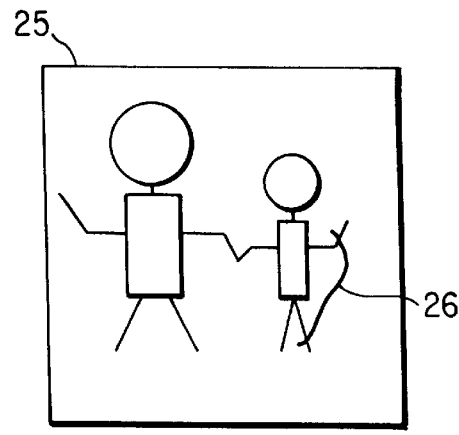
FIG. 2(a) is a pictorial view of a digital image with a defect pixel region.

Referring to FIGS. 2(a–c) and 3, the operation of apparatus 8 will be discussed. When computer system 10 is started, system 10 can receive a digital image from image reader 20 and store the image in memory 14. Alternatively, the digital image can be transferred from hard disk 18 to memory 14. The image stored in memory 14 will hereinafter be referred to as the "source image." An example of the source image 25 is shown in FIG. 2(a) with defect region 26. The source image may be comprised of a single color channel (monochrome), or have multiple color channels, such as RGB.

Once the source image is stored in memory 14, then the defect regions in the source image are located. Preferably, this is performed by the user identifying the approximate image areas containing the defect regions through user interface 22, and then processor 12 automatically detecting the defect pixels in those areas identified by the user. One system for identifying defect pixels is a system disclosed in EP 0 624 848 A3. Briefly, this defect pixel identification system automatically identifies small local regions of an image which are anomalous in both brightness/color, local contrast, and size, and outputs a map of the defect pixels in the image. Alternatively, the defect pixels may be selected manually by the user, which can be performed by a user generating a digital mask via user interface 22 (for example, by a graphic "painting" software application) identifying the defect pixels.

Figure 2B:
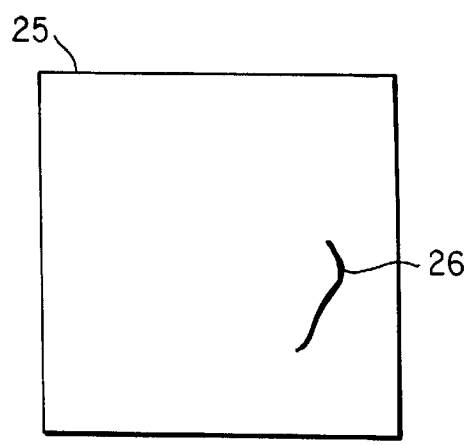
FIG. 2(b) is a pictorial view of a defect map for the digital image in FIG. 2(a)

Once the defect regions are located, a defect map is built and stored in memory 14 (step 104). In the defect map, pixels with a specified value correspond to defect pixels in the source image. One example of a defect map is shown in FIG. 2(b) for the defect region 26 of the source image 25 in FIG. 2(a). In this example, defect pixels have values of 0 (black), and non-defect pixels have values of 255 (white).

The method of the present invention, as implemented using the foregoing apparatus, will now be described. FIG. 3 is a block diagram of a correction method of the present invention (sometimes referenced as a "pixelfill process"). The pixelfill of defect regions can be considered in terms of the three following steps: an edge detection step 102, an edge manipulation step 104, and a correction step 106. In the detection step 102, strong edges that intersect defect regions are detected. The detected edges are stored in the edge map. The edges in the edge map are processed in the edge manipulation step 104 (e.g. edge thinning, geometric primitive extraction). Third, in the correction step 106, defect pixels are provided with new values based on the local non-defect pixels. An edge map is used to define the set of non-defect pixels used for the correction of a given defect pixel. These steps are described in more detail below.

1. The Edge Detection Step.

The edge detection step 102 is based on the gradient field. The gradient field has two attributes: magnitude and directional angle.

The local gradient field is calculated for non-defect regions adjacent to defect regions. One criterion for selecting the set of non-defect pixels for gradient calculation is that included non-defect pixels must be within a given distance from the defect region. A suggested distance value is three times the maximum width of the defect region. Width of the defect region at any defect pixel refers to the minimum width across the defect region at that pixel. Different embodiments may choose different ways of calculating the gradient field. A preferred implementation for color imagery is to calculate the vector gradient. In this case the image is considered as a two dimensional vector field with the number of attributes corresponding to the number of channels in the image. The magnitude of the gradient is the square root of the largest eigenvalue of $D^TD$. The direction of the gradient is the corresponding eigenvector. D is a spatial partial derivatives matrix. $D^T$ is a transposed matrix D. Spatial partial derivatives can be calculated using a 3×3 Prewitt operator.

Another possible implementation calculates gradient field based on scalar gradients of each channel. The gradient magnitude is then the square root of the sum of the squares of the gradient magnitudes of each color channel. The gradient directional angle can then be calculated as a weighted sum of directional angles of each channel.

A smoothing operation should be performed prior to the gradient field calculation for the images with a significant level of noise. A uniform blur was used for testing the preferred embodiment of the invention. The size of the uniform blur depends on the noise level of the image.

Figure 3B:
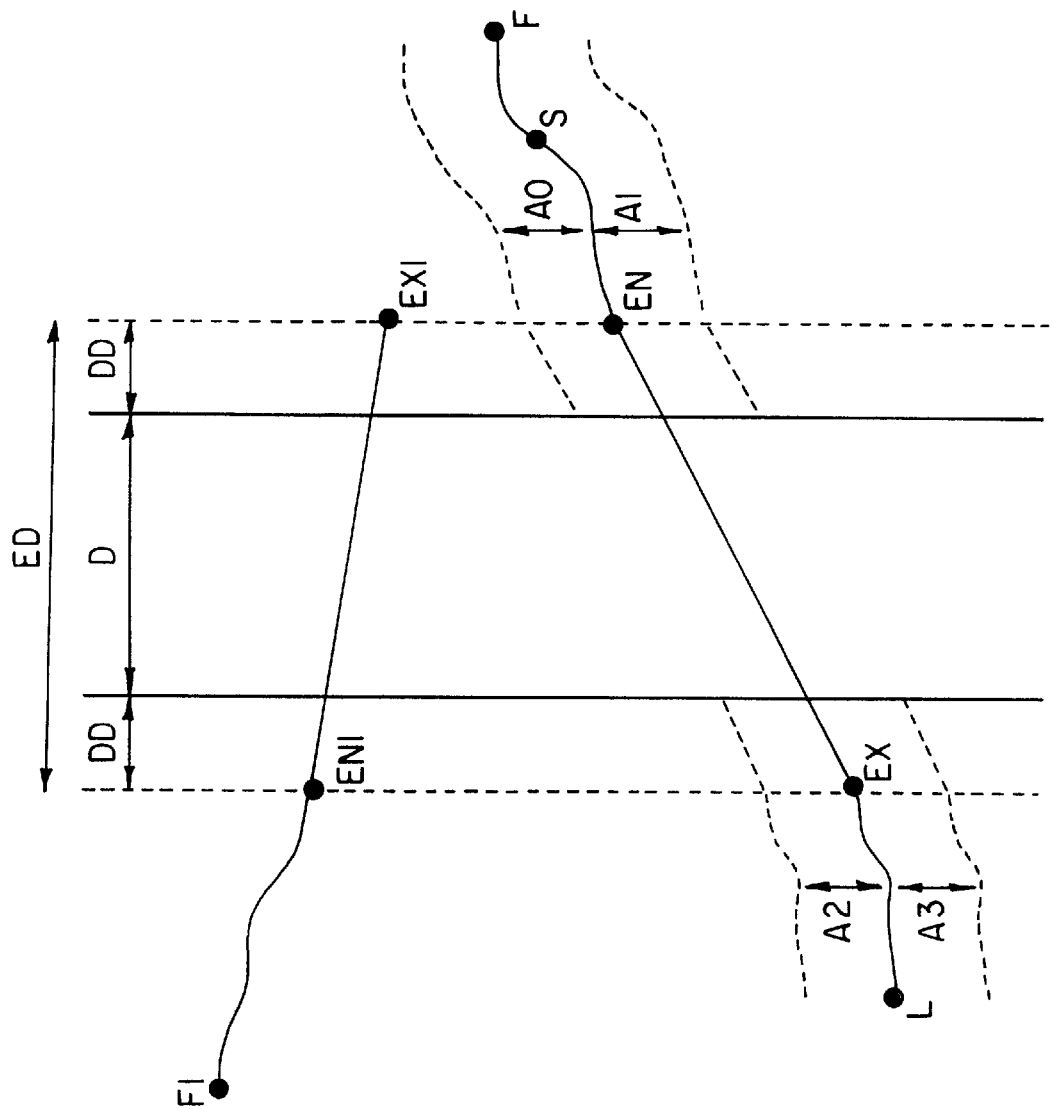
FIG. 3B is a pictorial representation of detected edges.
Figure 3A:
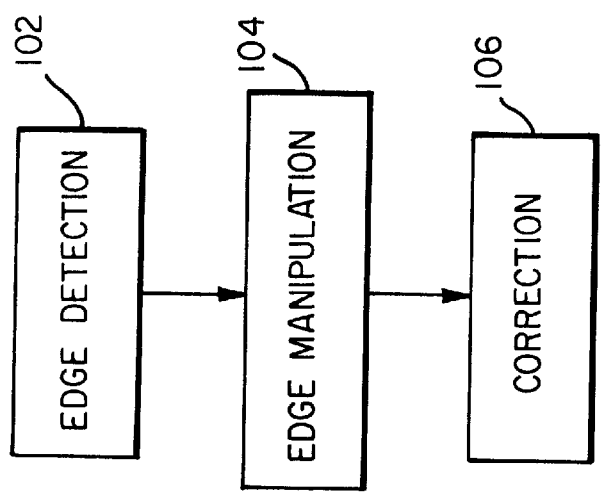
FIG. 3A is a block diagram broadly illustrating the method of the present invention as edge detection, edge manipulation and correction processes.

FIG. 3B illustrates the detection of edges in the edge detection step. An actual defect region D represents the defect pixels of unknown values. The extended defect region, designated by ED, includes actual defect region D plus adjacent non-defect pixels where the gradient is not considered valid due to the proximity of the defect pixels affecting blur and gradient operations. The extended defect region ED extends beyond the actual defect region D by a distance DD where DD=g+b, where 2g+1 is the gradient operator size and 2b+1 is the blur operator size.

Figure 4A:
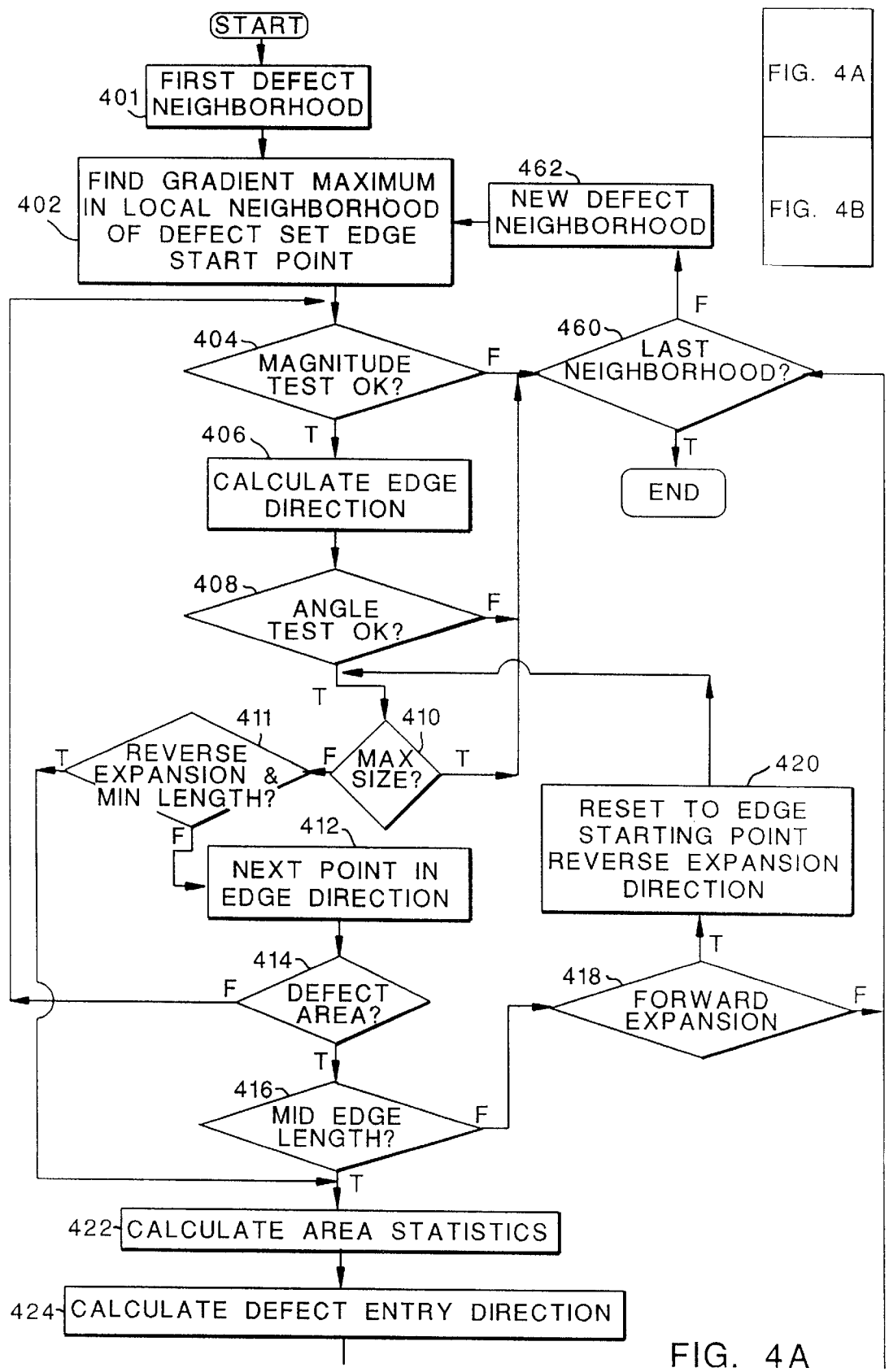
FIG. 4 is a flow chart of the edge detection process.
Figure 4B:
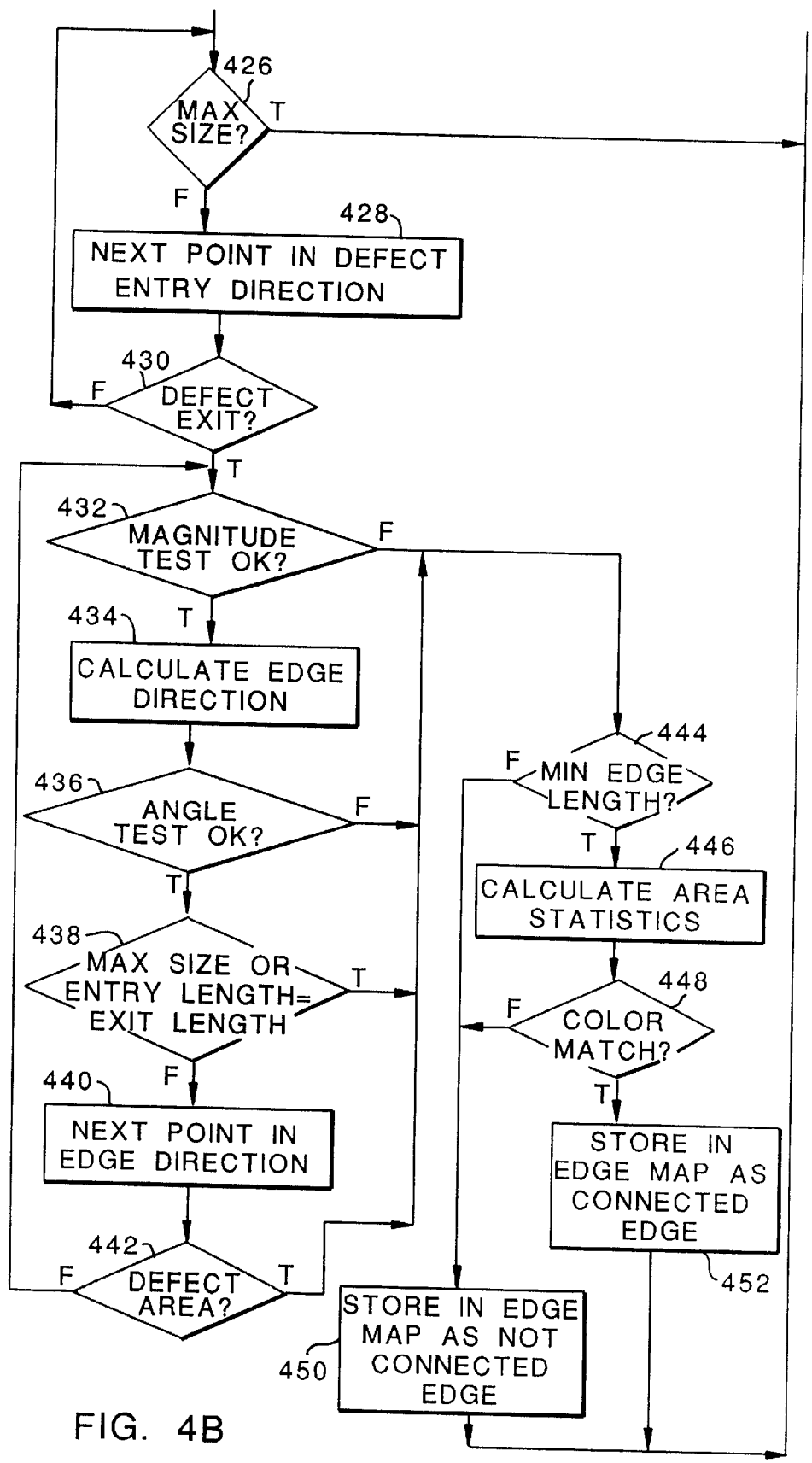

Edge detection begins with finding a local gradient maximum, as described particularly in connection with FIG. 4. Next, an edge expansion process starts from the local gradient maximum point S to locate a sequence of pixels representing an edge segment. In the edge expansion process the next edge point is selected as the closest point to the current edge point in the edge direction. The edge direction is calculated for each edge point based on the local gradient directional angles. First, the edge is extended toward the defect region. This stage is called forward edge expansion. The extended defect region ED is entered at the point EN.

If the number of edge points is less than a specified threshold number LMIN, representing a required minimum edge length, then the expansion is continued in a second stage from the start point S in the opposite direction until the required minimum length LMIN is reached at the point F. This second stage of the edge expansion is called a reverse edge expansion. Point F is referred to as the first point of the edge and the edge part extending between point F and point EN is referred to as the defect entry part of the edge. LMIN will be specified by a user dependent on the type of source images. When the extended defect region is entered in the forward edge expansion process and the number of edge points is greater than or equal to LMIN, the reverse edge expansion is not performed and point S is the first point of the edge. Next, the edge is extended from the defect entry point EN through the defect region to the defect exit point EX in the direction determined by the edge directional angles of the edge points preceding the defect entry point EN. The line segment between EN and EX is referred to as the defect part of the edge, and the angle defining the direction of the defect part of the edge is referred to as the defect entry angle. The edge expansion is continued from the point EX to point L for a specified number of points equal to the defect entry part length. Point L is referred to as the last point of the edge. The edge part extending between point EX and point L is referred to as the defect exit part of the edge.

Each point of the defect entry and defect exit part of the edge must satisfy magnitude and angle conditions. The magnitude condition means the gradient magnitude at the edge point must be greater than or equal to a specified threshold MMIN. The angle condition means the edge directional angle difference between two consecutive edge points is smaller than a specified threshold AMAX. If either of the magnitude or angle conditions is not satisfied the expansion process stops. AMAX and MMIN are defined by a user depending on the source image. In the preferred implementation AMAX is in the range of 15° to 22° and MMIN is in the range of 15% to 60% of the maximum gradient magnitude. Alternatively, these parameters can be defined automatically based on the noise in the image and the maximum gradient magnitude.

Two types of edges are detected: connected and not connected. The connected edge consists of three parts: a defect entry part (the edge part between points F and EN), a defect part (the edge part between points EN and EX) and a defect exit part (the edge part between points EX and L). The connected edge must satisfy magnitude and angle conditions (both specified above) for each point of defect entry and defect exit part, minimum length requirements and a color match constraint. The minimum length requirements mean the defect entry part of the edge must have at least LMIN length and the defect exit part of the edge must have at least a maximum of 3 pixels and ½ of LMIN. The color match constraint requires that there should be a color match between areas A0,A2 (which are areas adjacent to one side of a connected edge) and A1,A3 (which are areas adjacent to the second side of a connected edge). These areas extend a given distance perpendicular to the defect entry and defect exit parts of the edge. In the preferred implementation the area extension distance is equal to the half defect width. There is a color match between two areas if a Student's t-test is passed for a specified confidence level. The confidence level will be specified by the user depending upon the source image. Preferably the confidence level is in the range of 0.3 to 0.7.

The not connected edge consists only of two parts: a defect entry part (the edge part between points F1 and EN1)

and a defect part (the edge part between points EN1 and EX1). The defect exit point EX1 is the last point of the not connected edge. The not connected edge must satisfy magnitude and angle conditions (both specified above) for each point of the defect entry part and minimum length requirement. The minimum length requirement means the defect entry part has at least LMIN length.

Both the connected and not connected edges are stored in an edge map. The edge map allows finding detected edges at any pixel of the source image and retrieving edge attributes such as edge type (connected, not connected), edge length, color match attributes, all edge points, and the like.

FIG. 4 shows a flow chart of the process of searching for edges, as implemented by the appropriate software commands in the computer system of FIG. 1. The non-defect region adjacent to the defect region is searched for edge expansion start points. In the preferred implementation local gradient maxima which meet the magnitude condition are selected as the edge expansion start points. A square window centered at the non-defect pixel adjacent to the extended defect region is searched for the local gradient maximum. only non-defect pixels that are not points of any already detected edge are searched for the gradient maximum in the window. In the preferred implementation the size of the search window is equal to required minimum edge length LMIN. The search window is moved along the perimeter of the extended defect region in the loop represented by steps [401][460][462]. In step [401] the search window is positioned at the first non-defect pixel adjacent to the extended defect region encountered when the image is scanned. The window is searched for the maximum gradient magnitude [402]. If the maximum is smaller than a specified magnitude threshold MMIN [404] then a new defect neighborhood is selected [462] if available [460]. If the magnitude is greater than the threshold MMIN the start edge point, S, is found and the edge expansion process is initiated.

If the gradient magnitude is greater than threshold MMIN for the current edge point then the edge direction is determined [406]. First, an average gradient directional angle is calculated for the square window centered at the current edge point. The average edge directional angle is perpendicular to the calculated average gradient directional angle. The size of the averaging window depends on the noise level of the image and the size of the used blur operator. For the wide range of noise levels and associated blur sizes the 3×3 averaging window gives good results.

The average edge directional angle for the current edge point is checked [408] if it is within the specified angle tolerance AMAX of the average edge directional angle calculated for the previous edge point. This test is not performed for the start edge point when there is no previous edge point available. If the angle test fails then the maximum gradient search window is moved [462] to the next non-defect pixel adjacent to the extended defect region and the process starts again [402]. If the edge directional angle test is passed [408] and the maximum allowed edge length LMAX (equal to 5 times the maximum defect width) is not reached [410] and the expansion is in the forward direction [411] then the next closest pixel to the current edge point in the edge expansion direction is selected [412] as the new current edge point. If the new edge point is not in the extended defect region [414] then the magnitude test is performed [404] and the process continues as described above. If the extended defect region is entered [414] then the current edge length is checked [416]. If the required minimum edge length LMIN is not reached [416] and the edge expansion direction is to intersect the defect region (the forward expansion direction) [418], then the current edge point is reset to the start point and the edge expansion direction is reversed [420].

The flow of control for the reverse edge expansion process is the same as described above for the forward edge expansion with the exception that the reverse expansion stops when the minimum edge length LMIN is reached [411]. When the extended defect region has been entered and the defect entry part of the edge has at least the minimum number of required points LMIN then the statistics (average and variance) are calculated for the A0, A1 areas [422]. These statistics are later used to test a color match for the connected edge.

The defect entry direction is calculated [424] as the average edge directional angle of the specified number of edge points preceding the defect entry edge point. The number of the edge points used to calculate the defect entry direction is the minimum of the half defect width and the half length of the edge defect entry part in the preferred implementation. Alternatively, the edge properties e.g. the edge curvature and the edge directional angle variance can be used to determine the number of points for calculating the defect entry direction. The edge expansion process is continued through the extended defect region in the defect entry direction until the defect exit point is reached [426][428] [430]. The expansion process is aborted when the maximum allowed edge size LMAX is reached [426]. The edge expansion of the defect exit part of the edge is continued in a similar way as in the forward expansion of the defect entry part of the edge. For each edge point the gradient magnitude is checked [432] if greater than the specified threshold MMIN, and the edge directional angle is checked [436] if within a specified tolerance AMAX of the edge directional angle of the preceding edge point. However, in the case of the first point of the defect exit part (that is, the point adjacent to the extended defect region) the edge directional angle is checked if within a specified tolerance AMAX of the defect entry angle. If one of these tests fails the expansion is stopped. Also the expansion is stopped when the defect region is reached [442] or when the total edge length exceeds the maximum allowed length LMAX or the defect exit edge part length is equal to the defect entry edge part length [438].

When the defect exit edge part expansion is stopped the exit edge part length is checked [444] if greater than or equal to the previously specified required minimum edge length for the exit part. If not the edge is stored in the edge map as a not connected edge [450] consisting of defect entry part and defect part. Otherwise the statistics of the A2 and A3 areas are calculated [446] and the color match is tested [448] as described previously. If the color match test is passed for both area pairs A0,A2 and A1,A3 then the edge is stored [452] in the edge map as a connected edge consisting of defect entry part, defect part and defect exit part. Otherwise the edge is stored [450] in the edge map as a not connected edge. The edge expansion process is completed at that point. If the whole edge detection area in the image has been searched for edges [460] (i.e. the entire non-defect region about and adjacent to the defect region) the edge detection step is completed. Otherwise the edge detection process is continued [462].

2. Edge Map Manipulation

Figure 5A:
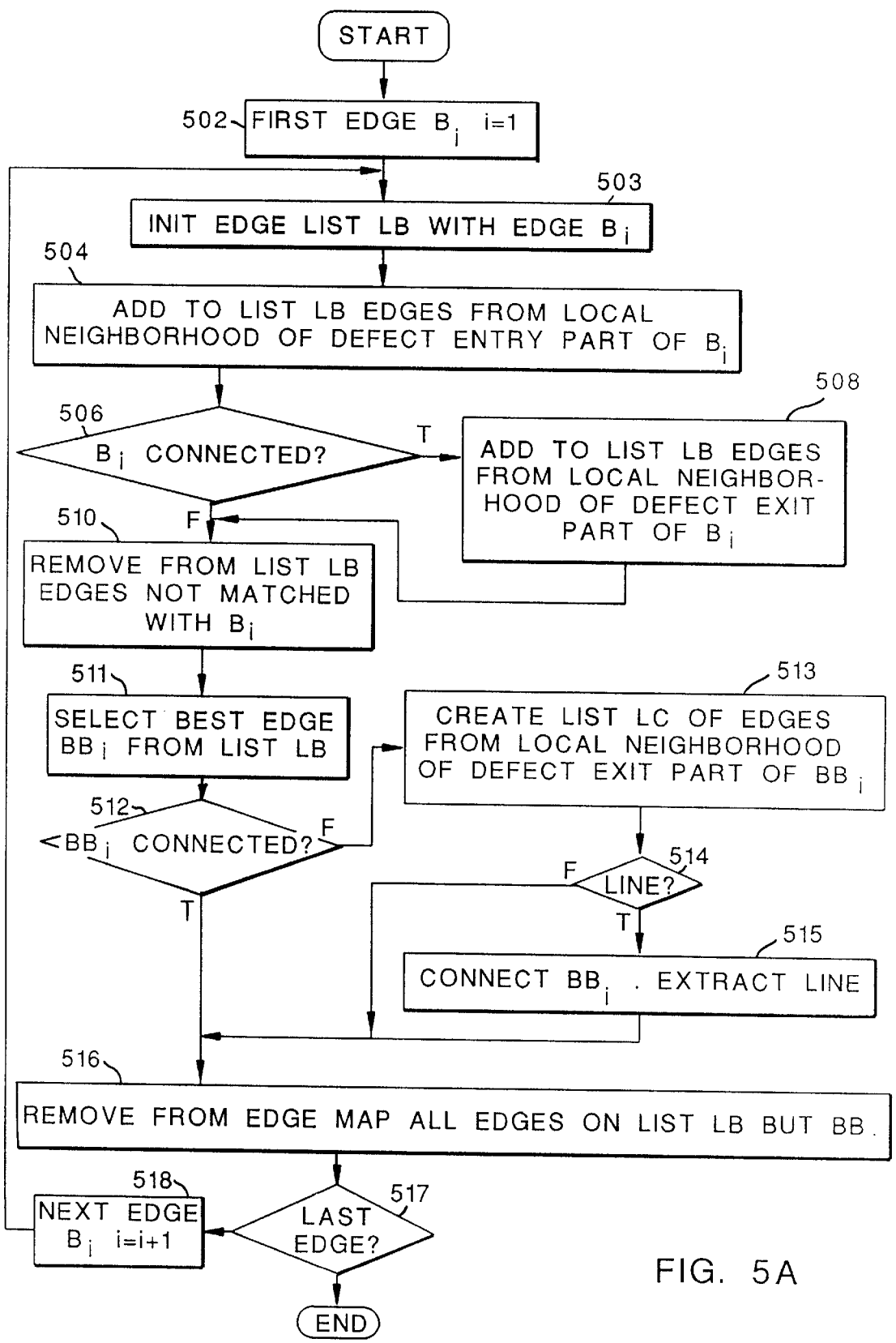
FIG. 5A is a flow chart of the edge thinning process.

In the edge detection step the edge map has been created. Based on the edge map, the edge manipulation process is performed. The edge manipulation process consists of two separate steps shown in FIG. 5a and FIG. 5b. In the first step, the edge map is scanned for edges and a thinning operation is performed on edges as shown in FIG. 5a. When the first step is completed for all edges in the edge map the second step is performed. In the second step, the edge map processed in the first step is scanned for edges and a geometric extraction operation is performed on edges as shown in FIG. 5b. Referring to FIG. 5a, the first step of the edge manipulation process will be described. Edges from the edge map are scanned in the loop represented by steps [502][517] [518]. It is assumed there are some edges in the edge map. The first edge is selected from the edge map in step [502]. For the selected edge $B_i$, the edge manipulation is performed in steps [503]–[516]. If the selected edge is the last edge in the edge map [517] then the first step of the edge manipulation process is completed. Otherwise the next edge is selected from the edge map [518] and the process continues. For the selected edge $B_i$, the edge manipulation starts with initializing empty edge list LB with the edge $B_i$ [503]. Next, edges from the local neighborhood of the defect entry part of the edge $B_i$ are added to the list LB [504]. In the preferred implementation in step [504], all edges that intersect a line segment centered at the selected point of the defect entry part of the edge $B_i$ are added to the list LB. The line segment direction is perpendicular to the edge $B_i$ at the selected edge point. The selected edge point is located a specified number NP of edge points from the defect entry point of the edge $B_i$ between the defect entry point and the first point of the edge $B_i$. The number NP of edge points is equal to half of the required minimum edge length LMIN. The line segment length is equal to 2g+2b pixels where 2g+1 is the gradient operator size and 2b+1 is the blur operator size.

If the edge $B_i$ is connected [506] then the edges from the local neighborhood of the defect exit part of the edge $B_i$ are added to the list LB [508]. In the preferred embodiment, the edge search in the local neighborhood of the defect exit part of the edge $B_i$ [508] is implemented in an analogous way as for the defect entry part [504].

When the list LB is complete all edges on the list that do not match with the edge $B_i$ are removed from the list LB [510]. Two edges on the list LB match if their defect entry angles are within a specified angle tolerance. In the preferred implementation, the angle tolerance for the edge match is equal to 15 degrees. The best edge $BB_i$ is selected from the remaining matched edges on the list LB [511]. If there are any connected edges on the list, the strongest of the connected edges is selected as the best edge $BB_i$. Otherwise the strongest of the not connected edges on the list is selected as the best edge $BB_i$. The edge strength is equal to the average gradient magnitude of its edge points.

If the best edge $BB_i$ is not connected [512] the connecting operation is performed for the edge $BB_i$ in steps [513]–[515]. In the connecting operation two not connected edges can be detected as the line geometric primitive and replaced in the edge map by the line primitive. In the preferred implementation the list LC of edges from the local neighborhood of the defect exit point of the not connected edge $BB_i$ is created [513] using a square window centered at the defect exit point. The size of the window is equal to 2THC+1. The threshold THC is defined below in a line geometric primitive specification. Next, the list LC is scanned and for each not connected edge from the list LC and the not connected edge $BB_i$ the geometric and color match constraints of a line geometric primitive are checked [514]. These constraints are listed below in a line geometric primitive specification (FIG. 6a). A not connected edge from the list LC detected as a line geometric primitive with the best color match gets connected with the edge $BB_i$ and a line geometric primitive extraction is performed [515]. The edge $BB_i$ and the selected not connected edge are replaced in the edge map by the new connected edge $BB_i$ representing a line primitive. This operations is described below in a line geometric primitive specification (FIG. 6a).

Next, all but the best edge $BB_i$ on the list LB are removed from the edge map [516]. The edge thinning operation for the edge $B_i$ is completed at that point. If the edge $B_i$ is the last edge the first step of the edge manipulation process is completed. Otherwise the next edge is selected [518] and the process continues [503].

When the first step is completed the second step of the edge manipulation process is performed (FIG. 5b). The edge map processed in the first step is scanned in the second step for the edges in the loop represented by steps [524][590] [592]. It is assumed there are some edges in the edge map. The first edge is selected from the edge map in step [524]. For the selected edge $BB_i$, the geometric primitive extraction operation is performed in steps [526]–[582]. If the selected edge is the last edge in the edge map [590] then the second step of the edge manipulation process is completed. Otherwise the next edge is selected from the edge map [592] and the process continues.

The selected edge $BB_i$ is followed in the edge map from its first point to its last point and a geometric primitive is extracted based on the intersected edges. The geometric primitives supported in the preferred implementation, the corresponding constraints and extraction operations are described in the next section (FIG. 6a–6f). A geometric primitive is detected if all of its geometric and color match constraints are satisfied. The selected edge must be a part of the detected geometric primitive. Different geometric extraction methods are used for the connected and not connected edge $BB_i$ [526].

If the selected edge $BB_i$ is connected [526] the points of the edge $BB_i$ are selected in the loop represented by steps [528][546][548]. The edge point selection loop starts with the first point of the edge $BB_i$ [528]. The geometric primitive extraction operation is performed in steps [530]–[542]. If the selected edge point $P_j$ is not the last point of the edge $BB_i$ [546] then the next edge point is selected [548] and the process continues until the end of the edge is reached [546]. At the selected edge point $P_j$ the edge map is checked for the intersected edges [530]. If there are no intersected edges [530] the next point of the edge $BB_i$ is selected [546] [548]. Otherwise a check is performed if the intersected edge is connected [532]. Depending on whether the intersected edge is connected or not connected [532] different geometric and color match constraints of supported geometric primitives are checked [540][534]. The detection of geometric primitives in steps [540][534] depends also on the intersected edges found at the preceding points of the edge $BB_i$. Next, the geometric primitive extraction is performed [536][542] based on the type of the detected geometric primitive. For the connected intersected edge the X-junction primitive, when detected, is extracted in step [536]. For the not connected intersected edge the T-junction primitive, when detected, or the background feature primitive, when detected, is extracted in step [542]. If the not connected intersected edge is not a part of any geometric primitive then it is removed from the edge map [542]. When the end of the edge $BB_i$ is reached [546] the final edge cleaning operation is performed [548]. If the connected edge $BB_i$ is intersected by some connected edges and no geometric primitive is detected then the edge $BB_i$ and all its intersected edges are removed from the edge map [548]. At that point the geometric primitive extraction operation is completed for the connected edge $BB_i$.

If the selected edge $BB_1$ is not connected [560] a different geometric primitive extraction method is used. The edge $BB_i$ is followed starting with its first point [560] in the loop represented by the steps [564][566]. At the selected edge point $P_j$ the edge map is checked for the intersected edges [562]. If there are no intersected edges [562] the next point of the edge $BB_i$ is selected [564] [566]. Otherwise a check is performed if the intersected edge is connected [568]. If the intersected edge is not connected [568] the geometric and color match constraints of the corner primitive are checked [580]. If the corner is detected then the corner extraction operation is performed [582] and the edge manipulation for the selected edge $B_i$ is completed [590]. If the corner primitive [580] is not detected then the intersected edge and the edge $BB_i$ are removed from the edge map [584] and the edge manipulation for the selected edge $BB_i$ is completed [590]. If the intersected edge is connected [568] then a part of the edge $BB_i$ extending from the point $P_j$ to the last point of $BB_i$ is removed from the edge map [570] and the edge manipulation for the selected edge $BB_i$ is completed [590]. If the not connected edge $BB_i$ does not intersect any edges [564] it is left in the edge map and the edge manipulation for the selected edge $BB_i$ is completed [590].

As a result of the edge manipulation step only extracted geometric primitives and single not connected edges are stored in the edge map.

FIG. 6a–6f shows all geometric primitives supported in the preferred implementation: a line primitive (FIG. 6a), a corner primitive (FIG. 6b), a background feature primitive (FIG. 6c), an open T-junction primitive (FIG. 6d), a closed T-junction primitive (FIG. 6e), an X-junction primitive (FIG. 6f).

Each geometric primitive is defined by geometric constraints and color match constraints. The geometric constraints define a unique edge geometric configuration. The color match constraints define pairs of edge adjacent areas that must match in color with a given confidence level. The color matching is implemented the same way as for the detection of the connected edges described in the previous section. The edge adjacent areas for the color match test extend a given distance perpendicular to the edge in the non-defect region. In the preferred implementation the area extension distance is equal to the half defect width. The mean and variance statistics for each color channel of an image are calculated for these areas. There is a color match between two areas if the Student's t-test is passed for each color channel statistics with a specified confidence level. In the preferred implementation 0.3 to 0.6 confidence level has given good results for a wide range of images.

Line Geometric Primitive

A line geometric primitive is described below. FIG. 6a shows a line geometric primitive. Each connected line is a line geometric primitive. A connected line does not require any extraction operation. Two not connected edges E0,E1 are detected as a line geometric primitive if the following geometric and color match constraints are satisfied.

Geometric constraints:

Two not connected edges E0,E1 must enter the defect region from the opposite sides. The defect entry angles of two not connected edges E0,E1 must be within a specified angle tolerance. In the preferred implementation 15 degrees is used as the angle tolerance for the angle difference normalized to 0–90 degrees. The minimum of distances between defect exit points and defect entry points of two not connected edges E0,E1 must be not greater than a specified threshold THC. In the preferred implementation THC is equal to $g+b+0.26L_{def}$ where $2g+1$ is the gradient operator size, $2b+1$ is blur operator size, $L_{def}$ is the maximum length of the defect part of edges E0,E1.

Color match constraints:

There must be a color match for the following pairs of areas (A1,A2), (A0,A3).

Extraction operation:

Two not connected edges E0,E1 that are detected as a line geometric primitive are replaced in the edge map by the edge E3. The edge E3 is a line segment through the point P which is the midpoint of the line segment connecting defect entry points of edges E0,E1. The direction of the edge E3 is defined by the average of two defect entry angles of edges E0,E1. The edge E3 extends on both sides of the defect region by the number of non-defect points corresponding to the lengths of defect entry parts of edges E0,E1.

Corner Geometric Primitive

A corner geometric primitive is described below. FIG. 6b shows a corner geometric primitive.

Geometric constraints:

A corner geometric primitive consists of two intersecting parts of the not connected edges E0,E1. The corner primitive edge parts extend from the edge first points to the intersection point of E0 and E1. The intersection angle of edges E0,E1 must be within a specified angle range. In the preferred implementation the 65 to 115 degrees range is used.

Color match constraints:

There must be a color match for the following pairs of areas (A1,A2), (A0,A3).

Extraction operation:

The edge parts extending beyond the intersection point to the edge last points are removed from the edge map.

Background Feature Geometric Primitive

A background feature geometric primitive is described below. FIG. 6c shows a background feature primitive.

Geometric constraints:

A background feature geometric primitive consists of the connected edge E0 and a part of the not connected edge E1 that extends from its first point to the intersection point with the edge E0. The intersection angle of edges E0, E1 must be within a specified angle range. In the preferred implementation the 65 to 115 degrees range is used.

Color match constraints:

There must be a color match for the following pairs of areas (A1,A2),(A3,A4),(A0,A5).

Extraction operation:

The part of the edge E1 that extends beyond the intersection point to the last edge point is removed from the edge map.

T-Junction Geometric Primitive

A T-junction geometric primitive is described below. FIG. 6d shows an open T-junction primitive. FIG. 6e shows a closed T-junction primitive.

Geometric constraints:

A T-junction geometric primitive consists of the connected edge E0 and parts of the not connected edges E1,E2 that extend from their first points to the intersection points with the edge E0. The intersection angles of E0,E1 and E0,E2 must be within a specified angle range. In the preferred implementation the 65 to 115 degrees range has been used. Additional geometric constraints can include a minimal distance between the edges E1,E2 and/or a match of defect entry angles of the edges E1,E2 within given angle tolerance.

Color match constraints:

There must be a color match for the following pairs of areas: (A1,A2),(A3,A4),(A5,A6),(A0,A7). In addition for an open T-junction primitive a color match is required for (A4,A7) and (A0,A3).

Extraction operation:

The edge parts of E1,E2 that extend beyond the intersection point with E0 to the last edge points are removed from the edge map. In addition for an open T-junction primitive the part of the connected edge E0 between the intersection points with the edges E1,E2 is removed from the edge map.

X-Junction Geometric Primitive

An X-junction geometric primitive is described below. FIG. 6f shows an X-junction geometric primitive.

Geometric constraints:

An X-junction geometric primitive consists of four connected edges E0,E1,E2,E3. The edges E0, E1 intersect the edges E2,E3. The intersection angles must be within a specified angle range. In the preferred implementation the 65 to 115 degrees range has been used. Additional geometric constraints for a X-junction primitive can include a minimal distance between edges E0,E1 and E2,E3 and/or match of defect entry angles of edges E0,E1 and E2,E3 within a given angle tolerance.

Color match constraints:

There must be a color match for the following pairs of areas: (A1,A2),(A3,A4),(A5,A6),(A7,A8)(A9,A10),(A11, A12),(A13, A14),(A0,A15). Because all edges of the X-junction primitive are connected there is a color match for the following pairs of areas: (A5,A14),(A6,A13),(A1,A10), (A2,A9).

Extraction operation:

The edge parts between intersection points are removed from the edge map.

3. Correction

In the correction step, values for each defect pixel for each color channel of an image are provided based on the local non-defect pixels. A local edge map is used to determine a correction method. Two correction methods are implemented in the preferred embodiment. If there are any local geometric primitives, a given defect pixel is corrected using weighted averaging of predicted values from the local geometric primitives. Otherwise a modified pinwheel correction method is used.

The correction method based on the local geometric primitives combines in a weighted fashion estimated values from 1-D predictors. Two types of 1-D predictors are used in the preferred implementation: an extrapolation predictor and an interpolation predictor. A 1-D extrapolation predictor uses non-defect pixels on one side of a defect pixel along a line segment in a given direction through the defect pixel. Any standard 1-D extrapolation predictor can be used e.g. nearest neighbor, least-squares linear fit, or the like. In the preferred implementation the least-squares linear fit is used. A 1-D interpolation predictor uses non-defect pixels on both sides of a defect pixel along a line segment in a given direction through a defect pixel. Any standard 1-D interpolation predictor can be used, for example, nearest neighbor, least-squares linear fit, or the like. In the preferred implementation the least-squares linear fit is used. Directions of the line segments for the extrapolation and interpolation predictors are determined by the local geometric primitives.

FIG. 8a–8f shows the line segment directions for extrapolation and interpolation predictors for each geometric primitive. In FIG. 8a–8f edges or parts of edges that are parts of a detected geometric primitive are shown for simplicity as line segments although as described in the edge detection step they may have non-linear shape in the defect entry or defect exit parts. Dashed straight lines with arrows on both ends represent line segment directions for the interpolation predictors. Dashed straight lines with an arrow only on one end represent line segment directions for the extrapolation predictors. The line segments used by extrapolation or interpolation predictors at a given defect pixel are in directions corresponding to directions of the neighboring parts of the local geometric primitives and must not intersect any geometric primitive. A direction of a geometric primitive part is defined by the defect entry angle of the corresponding edge. A "neighboring" part of the geometric primitive for a given defect pixel must not be separated from the defect pixel by any other part of a geometric primitive in the sense that the shortest line segment connecting the defect pixel and the neighboring part does not intersect any geometric primitive. For example, for the defect pixel P0 in FIG. 8d only E0 and E1 are neighboring parts. If a defect pixel lies on a part of a geometric primitive then the line segment extends along that part of the geometric primitive and it must not intersect other parts of a geometric primitive.

A line segment for the extrapolation predictor extends only on one side of the defect pixel and it must include a specified number of non-defect pixels. The number of non-defect pixels depends on the used extrapolation predictor. A line segment for the interpolation predictor extends on both sides of the defect pixel and it must include a specified number of non-defect pixels on each side. The number of non-defect pixels depends on the used interpolation predictor. For the nearest neighbor interpolation/extrapolation predictor only one non-defect pixel is required on one side of the corresponding line segment. In the preferred implementation the least-squares linear fit extrapolation and interpolation predictors are used and the required number of non-defect pixels of the line segment on one side of the defect pixel is equal to half of the defect width. If for a given defect pixel a line segment meeting the foregoing requirements extends on both sides of the defect pixel an interpolation predictor is used, otherwise if the line segment extends only on one side of the defect pixel an extrapolation predictor is used.

Figure 8A:
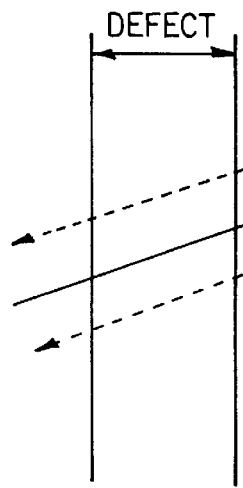
FIGS. 8A–8F is a pictorial representation of line segment predictors used in the process of estimating corrected values of defect region pixels.
Figure 8B:
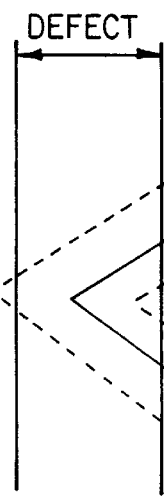
Figure 8C:
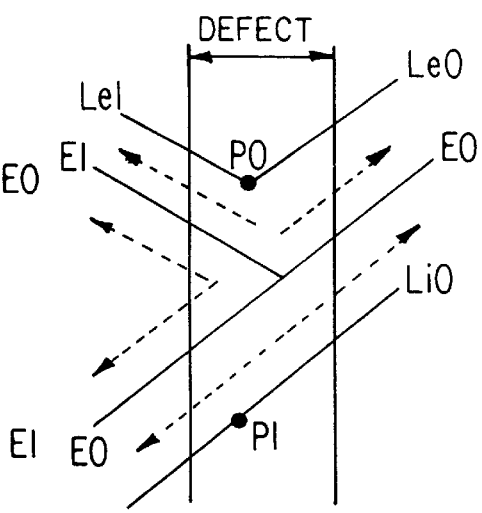
Figure 8D:
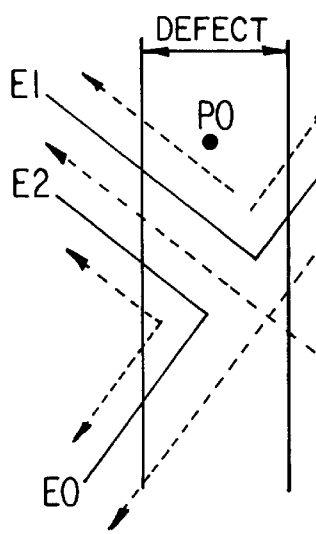
Figure 8E:
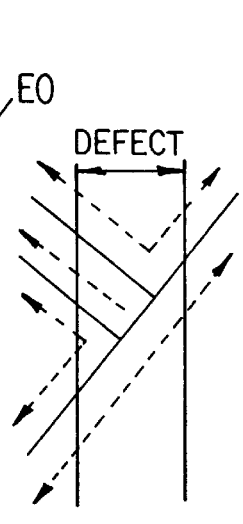
Figure 8F:
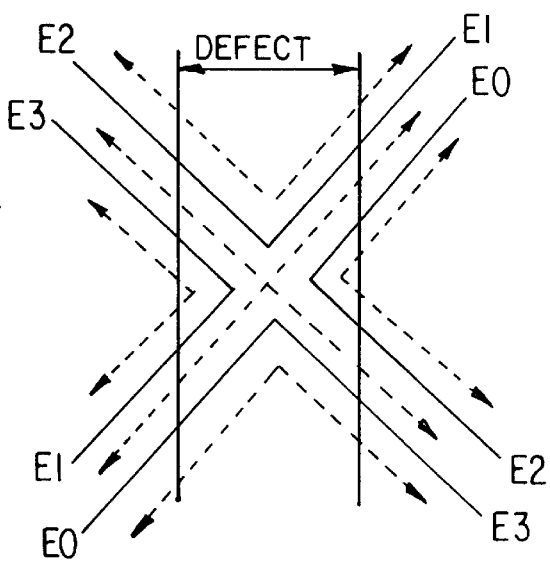

There is a one to one correspondence between each predictor and neighboring part of the local geometric primitives. The total number of predictors is equal to the total number of neighboring parts of local geometric primitives for a given defect pixel. FIG. 8c shows example line segments for interpolation and extrapolation predictors. Two extrapolation predictors (line segments Le0,Le1) are used for the defect pixel P0. One interpolation predictor (line segment Li0) is used for the defect pixel P1.

Figure 7A:
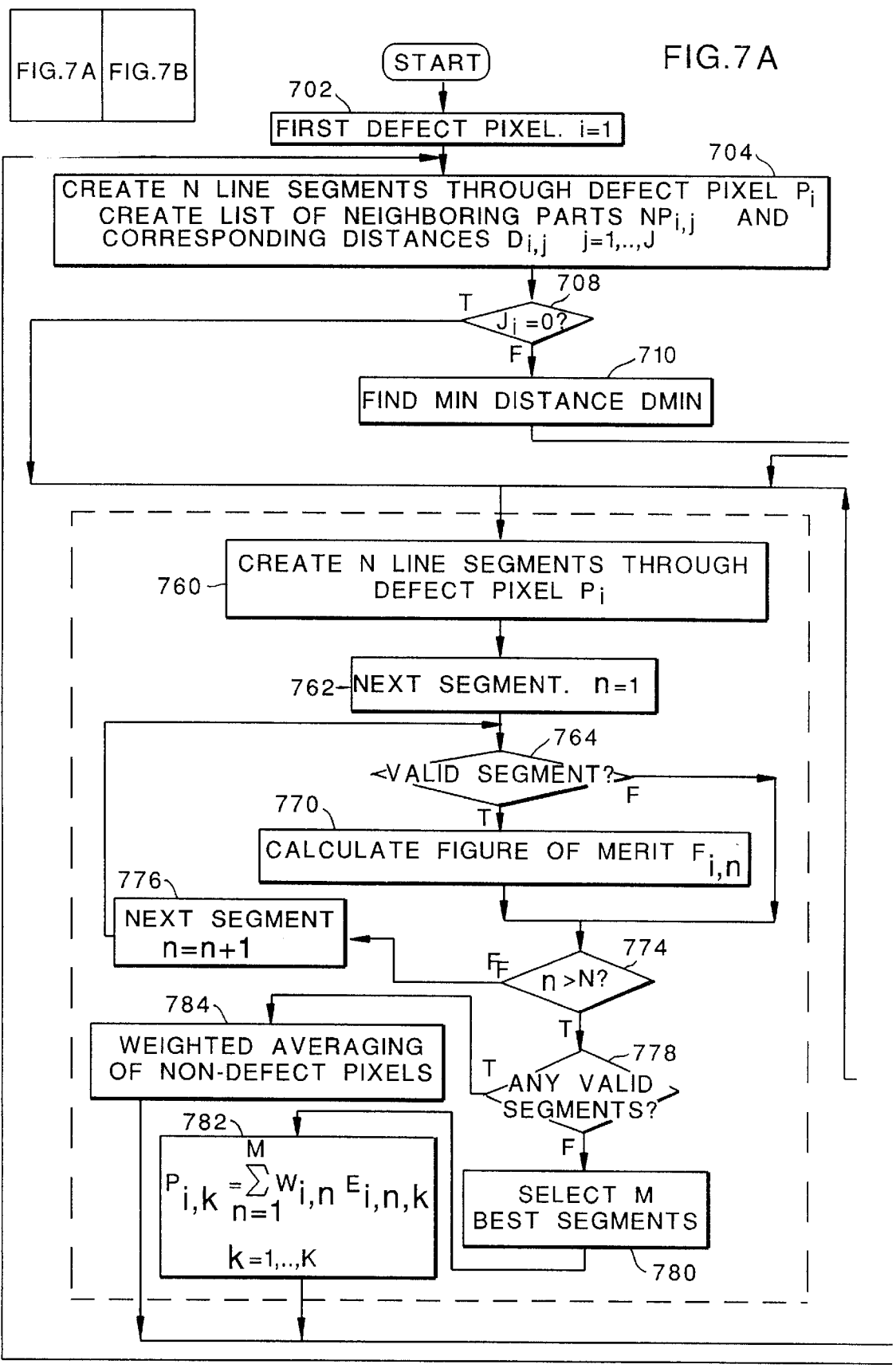
FIG. 7 is a flow chart of the correction process.
Figure 7B:
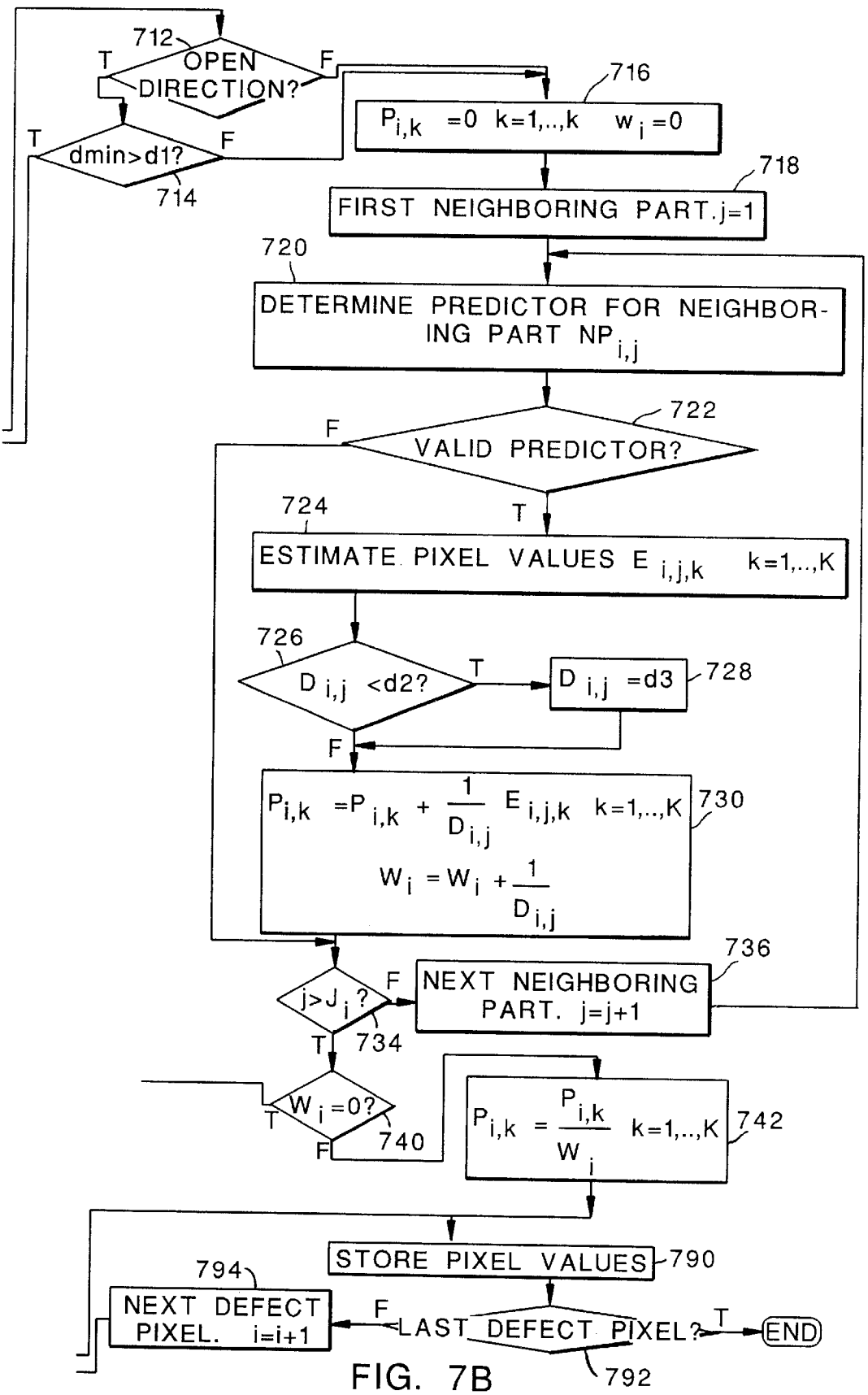

In the correction step the final values of the defect pixel are the weighted sum of all estimated values from extrapolation and interpolation predictors for each color channel, where the weights are inversely proportional to the distances from the defect pixel to the neighboring parts of the local geometric primitives. The distance between a defect pixel and a neighboring part is the length of the shortest line segment connecting the defect pixel and the neighboring part. The distance is clipped to the minimum limit greater than 0. The final values for the defect pixel are given by:

$$P_{i,k} = \sum_{j=1}^{J_i} W_{i,j} E_{i,j,k} \tag{EQ.1}$$

where:

$P_{i,k}$—value for the kth color channel of the ith defect pixel in the source image $W_{i,j}$—weight of the jth predictor for the ith defect pixel in the source image $$W_{i,j} = \frac{1}{C(D_{i,j})} \left( \sum_{j=1}^{J_i} \frac{1}{C(D_{i,j})} \right)^{-1}$$

where:

$D_{i,j}$ is the distance of the ith defect pixel from the neighboring part of the geometric primitive for the jth predictor; and C(d) is the clipping function defined in the following way $$C(d) = \begin{cases} d, & d > d2 \\ d3, & \text{otherwise} \end{cases}$$

in the preferred implementation d2=1 and d3=0.5;

$E_{i,j,k}$—estimated value for the kth channel of the ith defect pixel from the jth predictor; and $J_i$—number of predictors for the ith defect pixel FIG. 7 shows a flow chart of the correction process. The defect pixels are scanned in the loop represented by steps [702][792][794]. It is assumed there are some defect pixels in the image [702]. For each defect pixel local geometric primitives are detected [704–714]. Next, if any local geometric primitives are detected a correction method based on the local geometric primitives [716–742] is performed. Otherwise a modified pinwheel correction method [760–784] is used to provide new defect pixel values.

Assume $P_i$ is a selected ith defect pixel. First, a local neighborhood of the selected defect pixel is checked for the local geometric primitives in the edge map. A set of N line segments through the defect pixel is created in the edge map [704]. The line segments are at equal radial angle intervals with respect to each other about the defect pixel. The number of line segments depends on the size of the angle interval. In the preferred implementation 22.5 degrees is used which corresponds to 8 line segments. Preferably, each line segment is composed of pixels which are less than 0.5 pixel distance away from a line through the defect pixel at the radial angel associated with each respective line segment. The set of line segments defined above is referred to as a pinwheel. Each line segment is extended in the edge map on each side of the defect pixel starting from the defect pixel until one of the following four conditions are met: (i) a part of a detected geometric primitive is intersected; (ii) a specified number of non-defect pixels on each side of the defect pixel is reached; (iii) a maximum line segment length is reached; (iv) or an image boundary is reached. In the preferred implementation the maximum number of non-defect pixels on one side of the defect pixel along the line segment is equal to half the defect width and the maximum line segment length equals five times the defect width.

Each part of a detected geometric primitive $NP_{i,j}$ intersected by the pinwheel line segments and the corresponding distance between the intersection point and the defect pixel are stored on a list. Each intersected part is a neighboring part due to the fact it is the first one in a given pinwheel direction from the defect pixel. When all line segments are extended the list of neighboring parts is processed [704] to remove duplicated geometric primitive parts on the list and to find the minimum distance $D_{i,j}$ for each unique part $D_{i,j}$ on the list. The result is the list of all neighboring parts $D_{i,j}$ of the local detected geometric primitives for the selected pixel $P_i$, where j=1, . . . , $J_i$. If no geometric primitive is detected [708] that means the list is empty ($J_i$=0) then the modified pinwheel correction method is used [760–784]. Otherwise the minimum distance dmin on the list is found

[710]. dmin is the distance between the selected pixel $P_i$ and the closest neighboring part. Next, a test is performed to determine if there is an open direction at the selected pixel $P_i$ [712]. There is an open direction if there is at least one pinwheel line segment with a specified number of non-defect pixels on each side of the defect pixel and with no intersections with any geometric primitive. In the preferred implementation a required number of non-defect pixels on each side of the defect pixel along a line segment in the open direction is equal to half of the defect width. If there is no open direction the correction method based on the local detected geometric primitives [716] starts. If there is an open direction the minimum distance dmin is checked against a distance threshold d1 [714]. In the preferred implementation the distance threshold d1 equal to half of the defect width is used. If the minimum distance dmin is greater than the distance threshold d1 then a modified pinwheel correction method [760] starts. This method is described in the next section. Otherwise the correction method based on the local detected geometric primitives [716] starts.

For the correction based on local detected geometric primitives, the sum of estimated pixel values $P_{i,k}$ for the ith defect pixel is initialized to 0[716] for each color channel of an image k=1, . . . , K where K is the number of the color channels. Also the sum of weighting factors $W_i$ is initialized to 0[716]. The list of neighboring parts $NP_{i,j}$ of the local detected geometric primitives for the selected pixel $P_i$, where j=1, . . . , $J_i$, is scanned in the loop represented by steps [718][734][736]. For a given neighboring part $NP_{i,j}$ a corresponding interpolation or extrapolation predictor is determined [720]. The predictors are described above and shown in FIGS. 8a–8f. If there is no valid predictor [722] due to the defined constraints the next neighboring part is selected [734][736] and the processing loop continues [720]. If there is a valid predictor [722] the values of the ith defect pixel $E_{i,j,k}$ are estimated for each color channel k=1, . . . , K using jth predictor corresponding to the jth neighboring part. The clipping of the neighboring part distance $D_{i,j}$ is implemented in steps [726][728]. In the preferred implementation d2=1 and d3=0.5. Based on the clipped distance $D_{i,j}$ weighted estimated pixel values are added to the sum $P_{i,k}$ [730] for each color channel k=1, . . . , K. A weighting factor inversely proportional to $D_{i,j}$ is added to the sum $W_i$ [730]. The processing loop continues [736][720] until the last neighboring part is processed [734]. If no pixel values are estimated [740] than the modified pinwheel method starts [760] otherwise the sum of weighted estimated values $P_{i,k}$ is normalized by the sum $W_i$ of weighting factors [742] for each color channel k=1, . . . , K. The final values of $P_{i,k}$ are defined by the equation (EQ. 1). The calculated defect pixel values are stored in the corrected image [790].

If the correction method based on the local geometric primitives cannot be used [708–714] or it fails [740] the modified pinwheel method [760–784] is used instead. The pinwheel correction method is described in detail below. It is referred to as a standard pinwheel method. In the preferred implementation the pinwheel method starts with creating N pinwheel line segments through the defect pixel $P_i$ [760] in the source image. Any of the line segment creating/expanding methods described in connection with the standard pinwheel method below can be used. All pinwheel line segments are scanned in the loop represented by steps [762][774][776]. For each valid line segment its figure of merit is calculated [770]. A pinwheel line segment is valid [764] if two conditions are satisfied. First, there is a specified number of non-defect pixels on each side of the defect pixel along the line segment. This condition is the same as in the standard pinwheel method. Secondly, a valid line segment cannot intersect any geometric primitive. This condition is added in the preferred embodiment compared to the standard pinwheel method. The pinwheel created in the image [760] is duplicated in the edge map to check for the intersections with geometric primitives and to create the list LNC of local not connected edges [760] in a similar way as in step [704]. If a given pinwheel line segment is valid [764] then its total figure of merit $F_{i,n}$ is calculated [770]. In the modified pinwheel method the total figure of merit for nth pinwheel line segment at ith defect pixel in the source image is calculated according to the equation EQ.2. The total figure of merit is equal to sum of two components. One component is a figure of merit $F_V$ based on the uniformity of non-defect pixel values along nth pinwheel line segment measured by the total mean square error $SMSE_{i,n}$ for nth pinwheel line segment at ith defect pixel in the source image. $SMSE_{i,n}$ is calculated according to the equation EQ. 3. The more uniform non-defect pixel values along a given pinwheel line segment the higher figure of merit $F_V$. The detailed description of the total mean square error for a pinwheel line segment can be found in the description below relating to the standard pinwheel method. A least-squares line fitting is used in the preferred implementation to calculate a functional model of the non-defect pixel values along a pinwheel line segment. The figure of merit $F_V$ is calculated in the preferred implementation according to the equation EQ.4. The second component of the total figure of merit (EQ.2) is based on the local not connected edges. The list LNC of local not connected edges is built when the pinwheel is created in the edge map [760]. In the preferred implementation an alignment figure of merit with local not connected edges $F_A$ is calculated according to the equation EQ.5. $F_A$ has higher values for the pinwheel line segments aligned with directions of the local not connected edges. $F_A$ is scaled by the 'decay in distance' function D() which decreases with increased distance of the defect pixel from the local not connected edge. The 'decay in distance' function D() is calculated according to the equation EQ.6 in the preferred implementation.

When all pinwheel line segments are scanned [774] and there are no valid line segments [778] a weighted averaging of non-defect pixels of the pinwheel line segments is used to calculate defect pixel values [784]. This method [784] is described below in connection with the standard pinwheel method. If there are any valid line segments [774] the M valid line segments with the highest figures of merit are selected [780]. For each selected line segment at the ith defect pixel estimated pixel values $E_{i,n,k}$ for each color channel k=1, ..., K are calculated [782] using an interpolation in each selected line segment direction. A weighted averaging of the estimated values is used to calculate final values of the defect pixel [782] according to the equation EQ.7. Weighting is proportional to figures of merit according to the equation EQ.8. The final defect pixel values are stored in the corrected image [790].

$$F_{i,n} = F_V(SMSE_{i,n}) + k_A \sum_{j=1}^{L_i} D(D_{i,j}) F_A(A_{i,j}, A_n) \qquad (EQ.2)$$

$F_{i,n}$—total figure of merit for nth pinwheel line segment at ith defect pixel in source image $F_V(SMSE_{i,n})$—figure of merit for nth pinwheel line segment at ith defect pixel in source image based on total mean square error $SMSE_{i,n}$—total mean square error for nth pinwheel line segment at ith defect pixel in source image where $$SMSE_{i,n} = \frac{1}{K} \sum_{k=1}^{K} MSE_{i,n,k} \qquad (EQ.3)$$

K—number of source image color channels $MSE_{i,n,k}$—mean square error between non-defect pixel values and their functional model for kth color channel of nth pinwheel line segment at ith defect pixel in source image $F_A(A_{i,j}, A_n)$—alignment figure of merit of nth pinwheel line segment at ith defect pixel in source image with jth local not connected edge $A_{i,j}$—defect entry angel of jth local not connected edge for ith defect pixel in source image $A_n$—angle of nth pinwheel line segment $D(D_{i,j})$—'decay in distance' function $D_{i,j}$—distance between ith defect pixel and its jth local not connected edge $L_i$—number of local not connected edges for ith defect pixel in source image $k_A$—scaling factor equal to 1 in the preferred implementation In the preferred implementation figures of merit are defined in the following way:

$$F_V(SMSE_{i,n}) = MAX\left(\frac{SMSE_{MAX_i} - SMSE_{i,n}}{MAX(1, SMSE_{MAX_i} - SMSE_{MIN_i})}\right) \qquad (EQ.4)$$

MAX()—is a maximum function $SMSE_{MAX_i}$—maximum total mean square error for all valid pinwheel line segments at ith defect pixel in source image $SMSE_{MIN_i}$—minimum total mean square error for all valid pinwheel line segments at ith defect pixel in source image $$F_A(A_{i,j}, A_n) = MAX\left(0, 1 - \frac{|A_{i,j} - A_n|}{A_{MAX}}\right) \qquad (EQ.5)$$

$|A_{i,j} - A_n|$—absolute value of angle difference modulo 90 degrees $A_{MAX}$—maximum angle difference threshold equal to 90 degrees in the preferred implementation In the preferred implementation a 'decay in distance' function is defined in the following way:

$$D(D_{i,j}) = \frac{1}{1 + \left(\frac{D_{i,j}}{S_i}\right)^2} \qquad (EQ.6)$$

$S_i$—decay constant which, in the preferred implementation, is equal to minimum defect width at ith defect pixel in source image The final corrected pixel values are calculated according to the following equation:

$$P_{i,k} = \sum_{n \in S} W_{i,n} E_{i,n,k} \qquad (EQ.7)$$

$P_{i,k}$—final corrected value of ith defect pixel in source image for kth color channel $W_{i,n}$—weight of nth pinwheel line segment at ith defect pixel in source image where S set of indices corresponding to selected pinwheel line segments $$W_{i,n} = \frac{F_{i,n}}{\sum_{m \in S} F_{i,m}} \qquad (EQ.8)$$

$E_{i,n,k}$—interpolated value of ith defect pixel in source image for kth color channel along nth pinwheel line segment

Standard Pinwheel Method

The standard pinwheel method described below, while computationally efficient and yielding good results in many cases, may not provide an ideal result when filling long regions that intersect objects where the object width is smaller than or comparable to the width of the region. This could lead to the appearance of object separation and boundary distortions in the restored image. The operation of the standard pinwheel method, is described in detail below with reference to FIGS. 2a–c) and 9–14.

When computer system 10 is started at step 1098, system 10 receives a digital image from image reader 20 and stores the image in memory 14 (step 1000). Alternatively, this image may have already been stored in memory 14. The image stored in memory 14 will be referred to as the "source image." An example of a source image 25 is shown in FIG. 2(a) with defect region 26. The source image may be comprised of a single color channel (monochrome), or have multiple color channels, such as RGB.

Once the source image is stored in memory 14, then in step 1102 the defect regions in the source image are located. This may be done in the same manner as described above in connection with the method of the present invention.

Once the defect regions are located, a defect map is built and stored in memory 14 (step 1104). In the defect map, pixels with a specified value correspond to defect pixels in the source image. One example of a defect map is shown in FIG. 2(b).

In the standard pinwheel method, a window operator is set, preferably centered, on a first pixel in the source image (step 1106). In computer system 10, the window operator is used in performing correction of defect pixel values in the source image. The window operator defines a region of interest in the source image about a pixel centered within the region. In one embodiment, the shape and size of this window operator is a square region, where each side or boundary of the square region is X in size. However in another embodiment, the window operator may be a circular region having a diameter X. This window operator is used by processor 12 to scan across each pixel in the lines of the source image. The scanning pattern of the window operator is not critical as long as all defect pixels are visited during scanning. For example, a raster-scan pattern may be used.

In step 1107, a check is made to determine whether this pixel set within the window operator is a defect pixel by referencing the defect map stored in memory 14. If the pixel is a non-defect pixel, then in step 1109 the values of this non-defect pixel are stored in an area of memory 14 which is allocated for storing the corrected source image ("corrected image"). If the pixel is a defect pixel, then the defect pixel is selected ("PIXEL$_{SEL}$") for subsequent correction (step 1108). Next, a corrected value in each channel of PIXEL$_{SEL}$ is estimated (step 1110). The process for estimating corrected values is described in greater detail in FIG. 10.

Figure 10A:
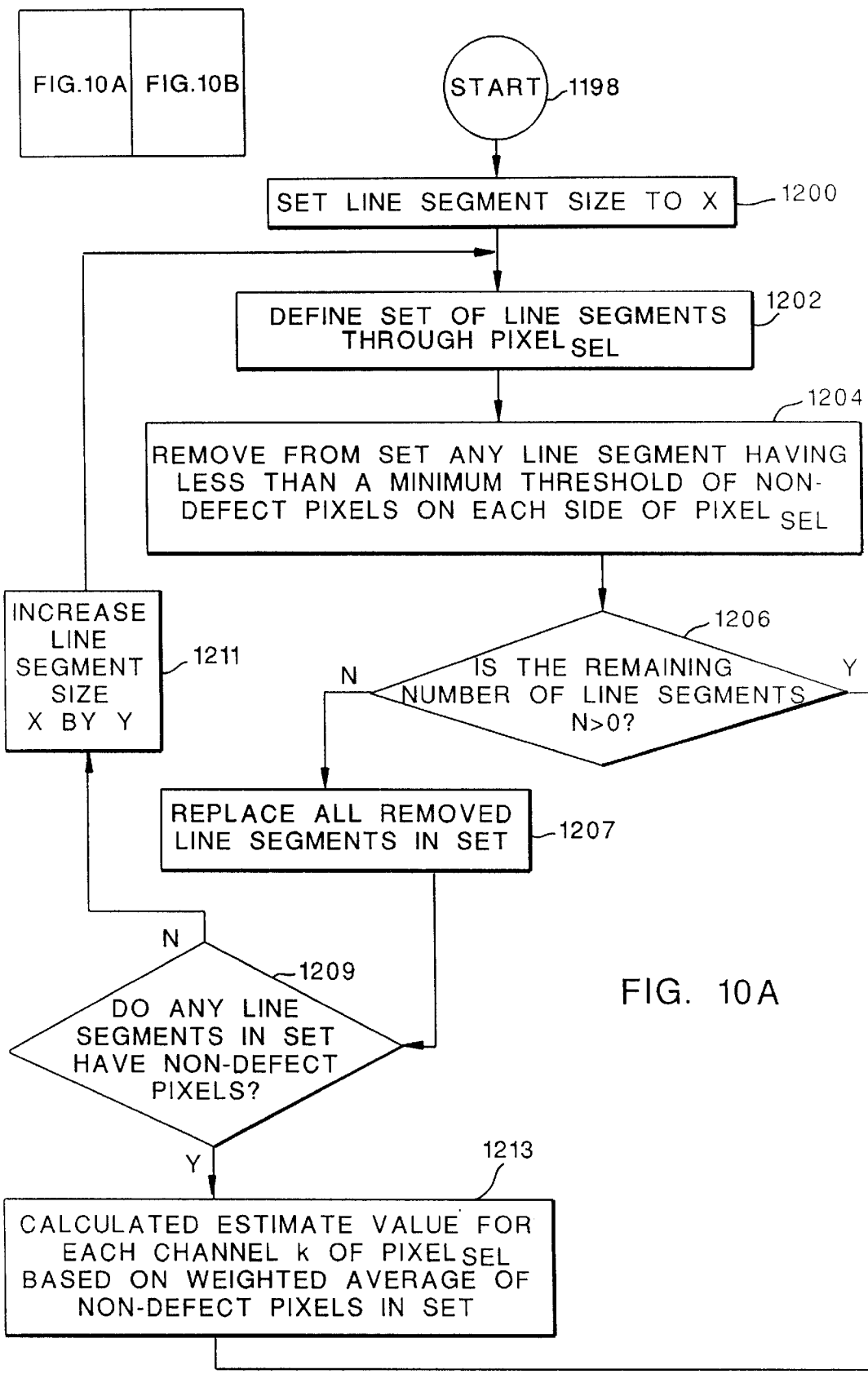
FIG. 10 is a flow chart illustrating a process for estimating corrected values for a defect pixel in accordance with the standard pinwheel method.
Figure 10B:
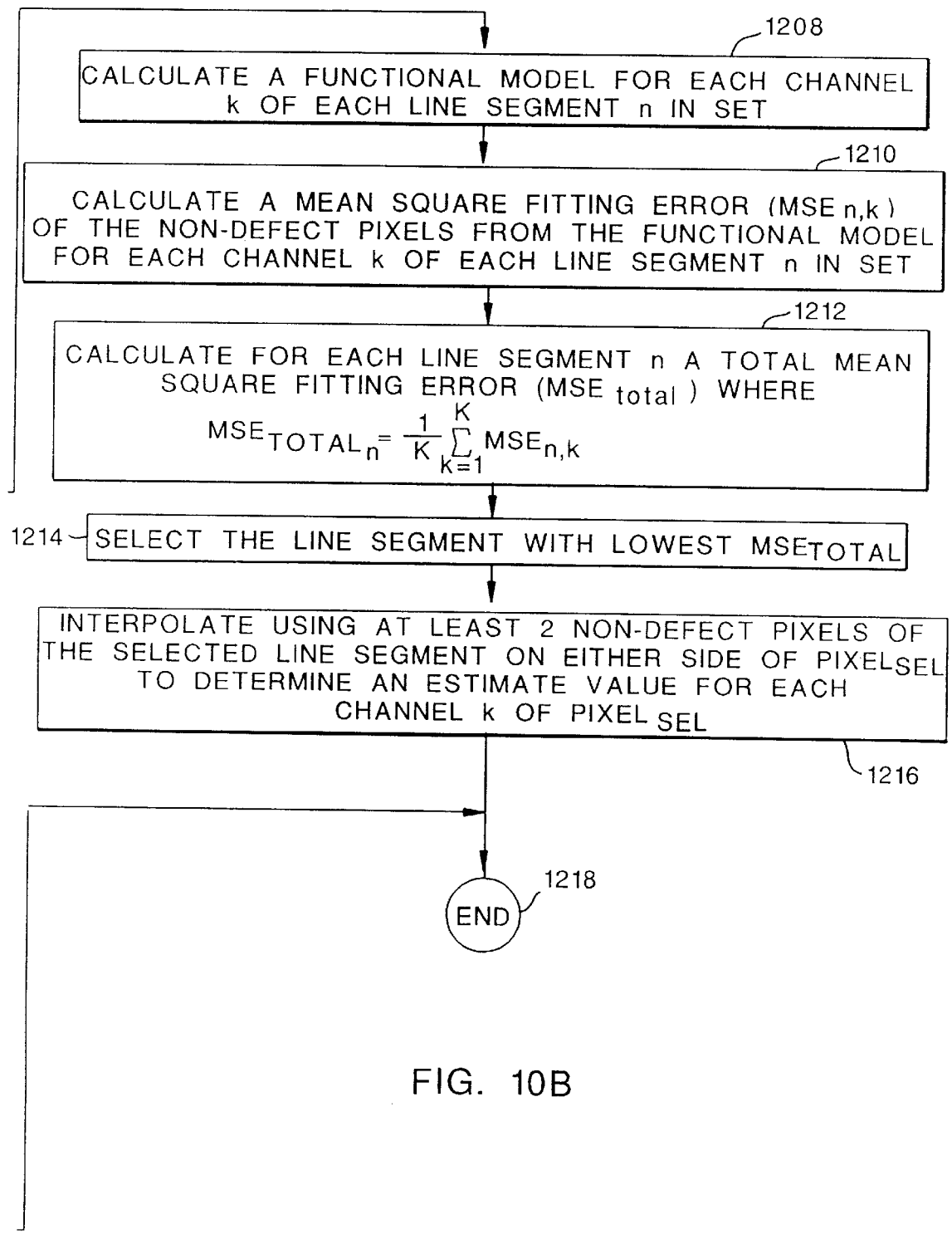

Referring to FIG. 10, the process for estimating corrected values for PIXEL$_{SEL}$ is started at step 1198. The line segment size is set to X for every direction (step 1200). Preferably, X is at least twice the maximum width of the defect region in the source image. A SET of line segments or vectors is defined or allocated through PIXEL$_{SEL}$ wherein each line segment is composed of both defect and non-defect pixels in the source image on one or both sides of PIXEL$_{SEL}$ (step 1202). In this embodiment, the total number of pixels defect and non-defect pixels, in each line segment is maintained the same, which corresponds to the square window operator. Alternatively, each line segment can have the same length X defined as the Euclidean distance, which corresponds to the circular window operator. However, in other embodiments the total number of pixels in each line segment may vary depending on the defect pixel and line segment, as will be described later.

SET is composed of N number of line segments, where each line segment is represented by the following notation: In SET, n refers to each line segment (n=1 to N). Each line segment n has pixels having values for K number of color channels. The nth line segment is referred to as LS$_n$. The kth channel of the nth line segment in SET is referred to as LS$_{n,k}$. For example, where SET has 4 line segments (N=4), and each pixel has 3 channel values (K=3), the 2nd channel of the 3rd line segment in SET is LS$_{3,2}$.

Preferably, the line segments are each at equal radial angles at 45° or 22.5° intervals with respect to each other about PIXEL$_{SEL}$, although the angles can vary as needed. The number of line segments in SET depends on size of this angle. For example, radial angles at 45° intervals provide 4 line segments in SET, while radial angles at 22.5° intervals provides 8 line segments in SET. Preferably, each line segment is composed of pixels which are less than 0.5 pixel distance away from a line through PIXEL$_{SEL}$ at the radial angle associated with each respective line segment.

Figure 14:
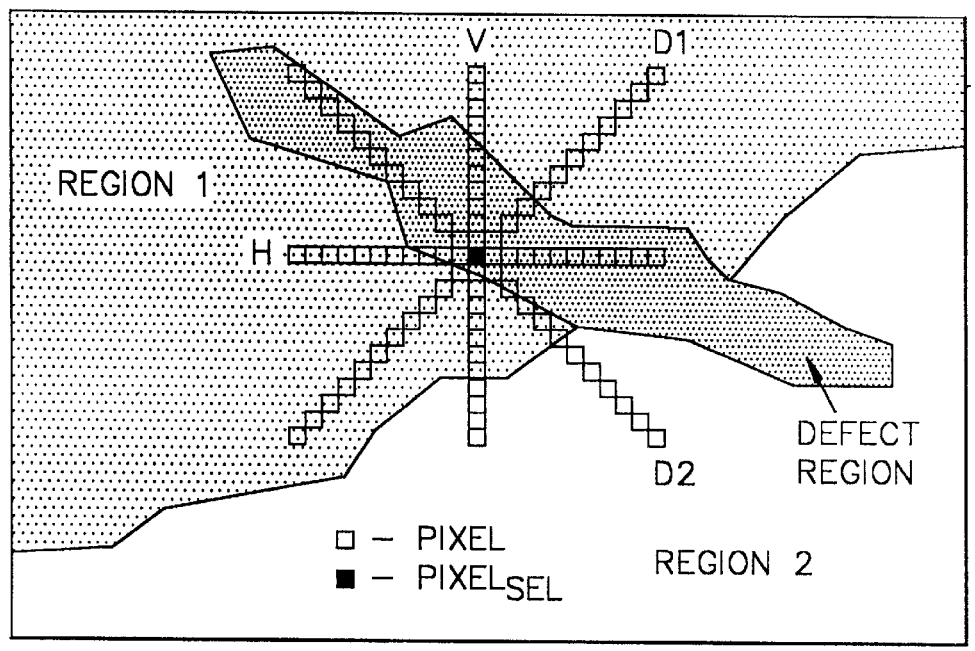
FIG. 14 is a pictorial view of an example illustrating line segments defined about a defect pixel.

Referring to FIG. 14, an example of a SET of 4 line segments (H, V, D1, and D2) is shown at 45° spacing to each other, where each line segment is composed of a total of 22 pixels and has 11 pixels on each side of PIXEL$_{SEL}$.

Referring back to FIG. 10, once the SET of line segments is defined, then at step 1204 any line segments which do not contain a minimum threshold number of non-defect pixels on each side of PIXEL$_{SEL}$ are considered not valid line segments, and are removed from SET. Preferably, the minimum threshold is set to half the number of pixels on one side of a line segment. For example, if each line segment has 8 pixels, then 4 pixels are on each side of PIXEL$_{SEL}$ and the minimum threshold is 2 pixels. Accordingly, any line segment which does not have at least 2 non-defect pixels on each side of PIXEL$_{sel}$ is removed from SET.

Next, a check is then performed to determine whether the remaining number of line segments N in SET is greater than zero (step 1206). If N is not greater than zero, then the "no" branch is taken to step 1207 where all the line segments previously removed are replaced in SET. Once the line segments are replaced, a query is made to determine whether any of the line segments have non-defect pixels (step 1209). If there are no non-defect pixels in the line segments of SET, then the "no" branch is taken to step 1211 where the line segment size X is increased by Y. This accordingly expands the window operator region by Y, thereby increasing the possibility that when SET is redefined line segments will include non-defect pixels. A new SET of line segments is redefined through PIXEL$_{SEL}$ at this increased line segment size at step 1202, and the process as described above is repeated If the line segments at step 1209 contain any non-defect pixels, then the "yes" branch is taken to step 1213 where an estimated value for each channel k of PIXEL$_{SEL}$ is calculated based on the weighted average of the non-defect pixels in SET. These weights are determined by their respective distances from PIXEL$_{SEL}$.

The calculation for estimating values for each channel k of PIXEL$_{SEL}$ at step 1213 preferably is as follows:

$$PIXEL_{SEL_k} = \frac{\sum_{i=1}^{Q} W_i P_{i,k}}{\sum_{i=1}^{Q} W_i} \quad (EQ. 9)$$

where:

i=index for each non-defect pixel in SET;
Q=total number of non-defect pixels in SET;
$P_{i,k}$=the value of the kth channel of the ith non-defect pixel in SET; and
$W_i$=the weight for the ith non-defect pixel in SET, where $$W_i = ((x_i - x_{SEL})^2 + (y_i - y_{SEL})^2)^{-\frac{1}{2}} \quad (EQ. 10)$$

Figure 9:
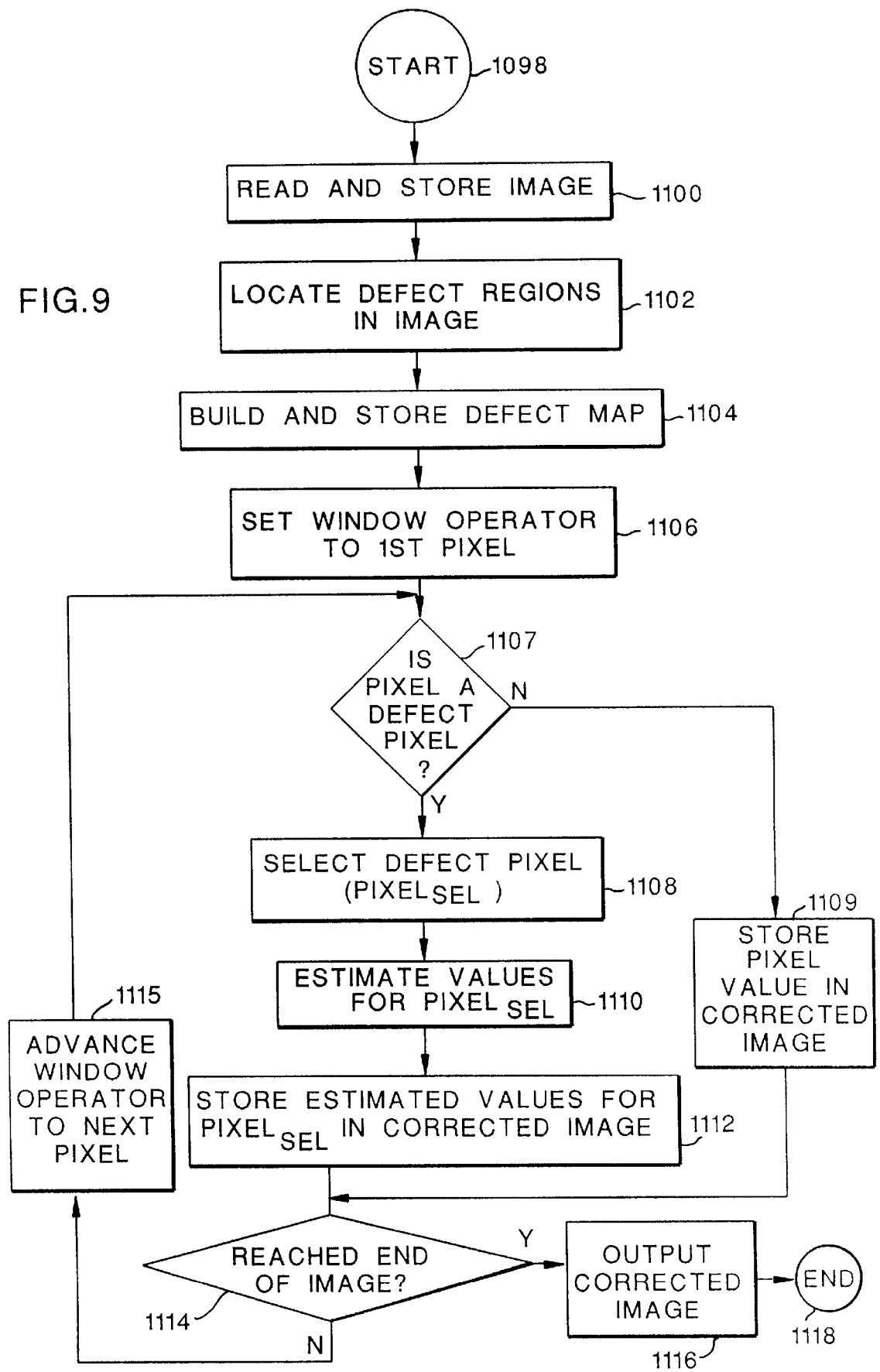
FIG. 9 is a flow chart illustrating a "standard pinwheel" method for correcting defect pixels in a digital image in accordance with the present invention.

$x_i$ and $y_i$=the x and y coordinates of the $i^{th}$ non-defect pixel in SET in the source image, and
$X_{SEL}$ and $Y_{SEL}$=the x and y coordinates of $PIXEL_{SEL}$ in the source image Once the estimation of values for $PIXEL_{SEL}$ is completed (step 1218) processing then goes to step 1112 in FIG. 9.

If at step 1206 the number of line segments N is greater than zero, then the "yes" branch is taken to step 1208 where a functional model is calculated for the non-defect pixel values for each channel k of each line segment in SET. The functional model calculation is performed by fitting the values of the non-defect pixels in a line segment to a mathematical model, such as a flat field fit, linear fit, or quadratic fit. This fitting is based on the values of the non-defect pixels, and the distances between them. A variety of techniques may be used for modeling the non-defect pixel values, and the particular technique chosen will affect model accuracy, and require a different minimum number of non-defect pixels. One example of this technique is shown in W. PRESS, S. TEUKOLSKY, W. VETTERLING, AND B. FLANNERY, NUMERICAL RECIPES IN FORTRAN, Ch. 15 (2d ed., 1992). In the preferred embodiment, the functional model calculation at step 1208 uses a linear least-squares fit, which requires at least one non-defect pixel lying on each side of $PIXEL_{SEL}$. Earlier performed step 1204 may be used to assure that this minimum is met for all line segments in SET.

Next at step 1210, a mean square fitting error (MSE) is calculated of the non-defect pixel values from the functional model for each channel of each line segment in SET. The MSE calculation is a statistical measure of the deviation of the non-defect pixel values in a line segment from an estimate of their values based on their functional fit. Thus, the lower a MSE value the more consistent to the model are the non-defect pixel values. For a given channel and line segment, MSE is calculated by determining the difference between the value of each non-defect pixel from its value estimated along the functional model. The resulting difference for each non-defect pixel is then squared, and the sum of these squares is averaged to obtain the MSE. (In the case of a flat field fit for the functional model calculation, the MSE is equivalent to the variance of the non-defect pixels in the line segment.) Mean square fitting error of the kth channel of the nth line segment ($MSE_{n,k}$) is calculated by:

$$MSE_{n,k} = \frac{1}{M_n} \sum_{i=1}^{M_n} (P_{i,n,k} - p_{i,n,k})^2 \quad (EQ. 11)$$

where:

$M_n$=number of non-defect pixels in $LS_n$;
i=index for each non-defect pixel in $LS_n$ from 1 to $M_n$;
$P_{i,n,k}$=the actual value of the ith non-defect pixel in channel k in $LS_n$; and
$P_{i,n,k}$=the functional model estimate value of the ith non-defect pixel in channel k in $LS_n$.

Then at step 1212, a calculation is performed for each line segment wherein each channel of the line segment is combined to provide a total mean square fitting error value ($MSE_{Total_n}$), where:

$$MSE_{Total_n} = \frac{1}{K} \sum_{k=1}^{K} MSE_{n,k} \quad (EQ. 12)$$

K=the total number of channels (for RGB, K=3); and
k=index for each channel from 1 to K.

The line segment having the lowest $MSE_{Total}$ is then selected (step 1214). The selected line segment represents the preferred line segment for determining estimated values for $PIXEL_{SEL}$. An estimated value for each channel k of $PIXEL_{SEL}$ is then interpolated using at least one non-defect pixel of the selected line segment on each side of $PIXEL_{SEL}$ (step 1216). In this manner, by selecting the line segment with the lowest total mean square fitting error, the line segment representing non-defect pixels which are most consistent to their functional model across all channels is used in determining the estimated values for $PIXEL_{SEL}$. Once the estimation of values for $PIXEL_{SEL}$ is completed (step 1218) then processing goes to step 1112 in FIG. 9.

Referring to FIG. 14, an example of the processing in FIG. 10 is described below. FIG. 14 shows an expanded view of a source image with a defect region extending from Region 1 to Region 2, wherein each region is composed of pixels with similar pixel values, which are distinct between regions. There are 4 line segments in SET labeled H, V, D1 and D2, which are defined through $PIXEL_{SEL}$ at the center or intersection of the line segments (step 1202). Once defined, line segment H and D2 are removed from SET because each has a side without any non-defect pixels, and therefore is below a minimum threshold of 4 non-defect pixels (step 1204). Next, a functional model is fitted and a mean square fitting error is calculated for remaining line segments V and D1(steps 1208–1210). In the single color channel (K=1) example of FIG. 14, the mean square fitting error for line segment D1 is lower than the mean square fitting error for line segment V. This is due to the excessive fitting error for dissimilar non-defect pixel values along line segment V extending through Region 1 and Region 2. In contrast, the non-defect pixels of line segment D1 all lie within Region 1 and have uniform pixel values. Thus line segment D1 has a lower fitting error than line segment V. Consequently, at step 1214 line segment D1 is selected, and at step 1216 $PIXEL_{SEL}$ is replaced with an estimate value based upon the non-defect pixels in line segment D1.

Figure 11A:
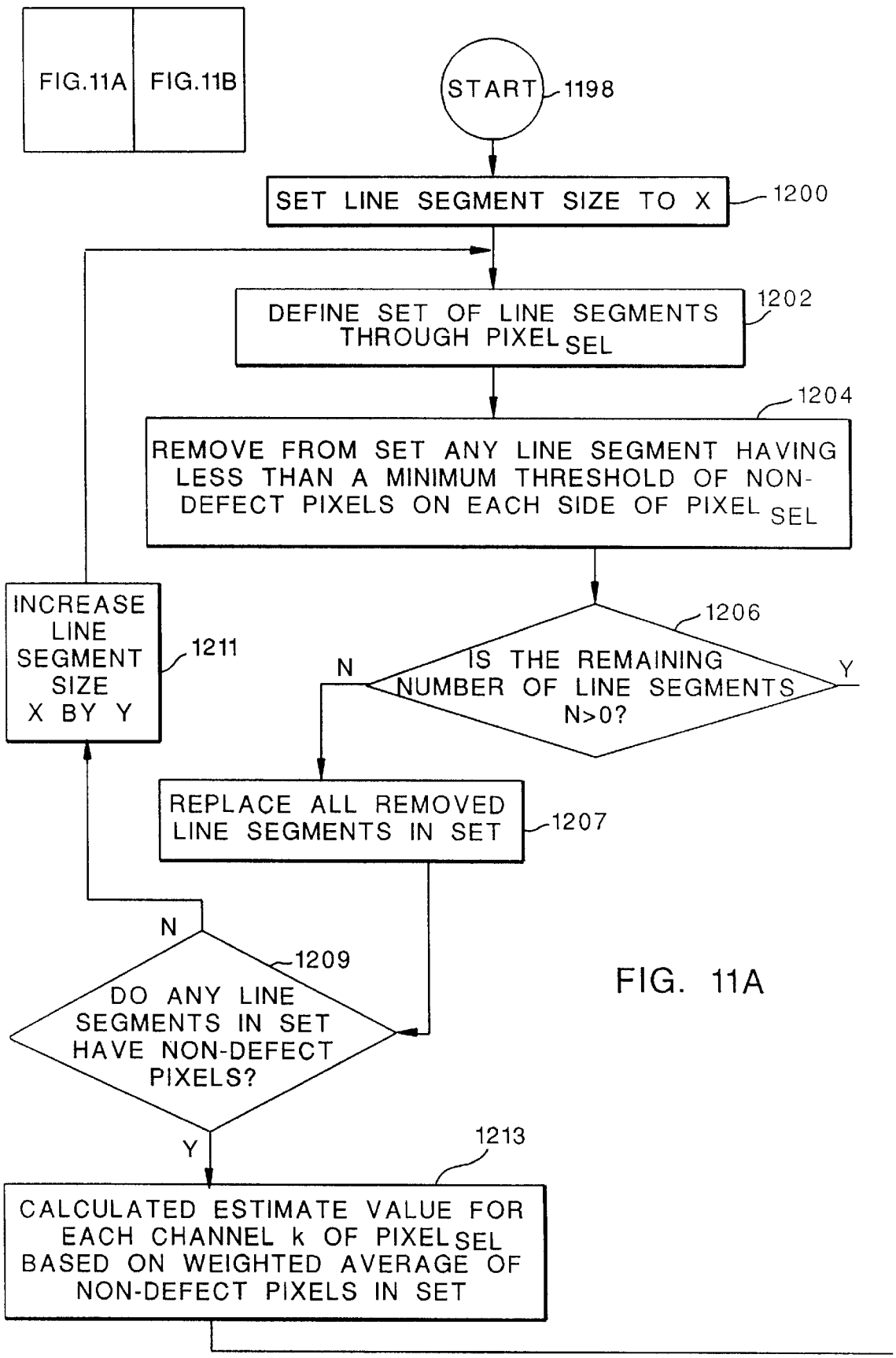
FIG. 11 is a flow chart of another embodiment of the standard pinwheel method illustrating a process for estimating corrected values for a defect pixel.
Figure 11B:
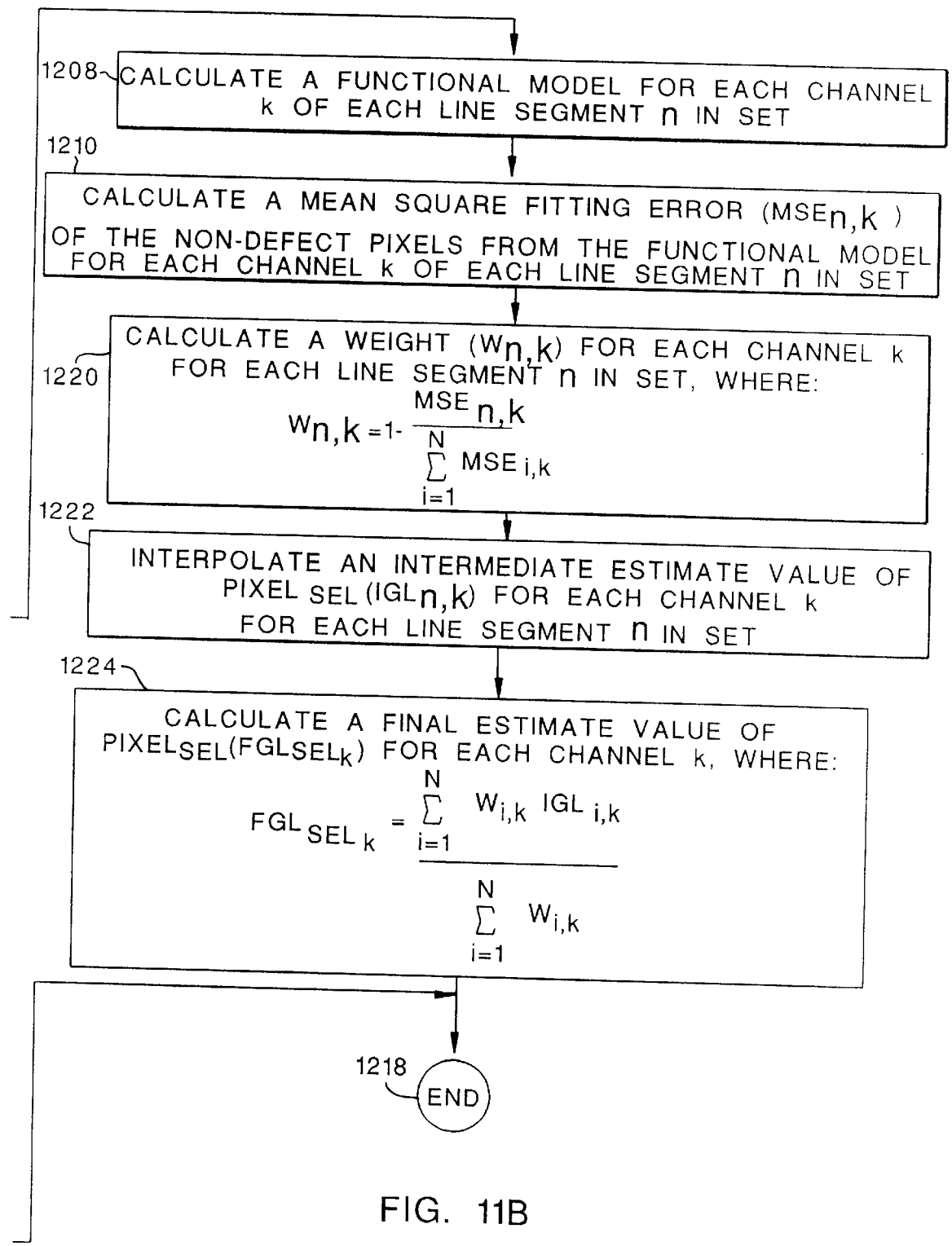

Referring to FIG. 11, an alternative embodiment for estimating corrected values for $PIXEL_{SEL}$ is illustrated. Corresponding steps in FIG. 11 have numeral designations which correspond to those in FIG. 10 and will not be described again. Accordingly, once the mean square error calculations are made at step 1210, then a weight ($W_{n,k}$) is calculated at step 1220 for each channel k for each line segment n in SET, where:

$$w_{n,k} = 1 - \frac{MSE_{n,k}}{\sum_{i=1}^{N} MSE_{i,k}} \quad (EQ. 13)$$

As shown by the equation (EQ. 13), the lower the mean square fitting error for a given line segment in a given channel, the greater will be the calculated weight. Next, an intermediate estimate value of $PIXEL_{SEL}$ ($IGL_{i,k}$) is interpolated for each channel k for each line segment in SET (step 1222). Once the interpolated process is completed, a final estimate value of $PIXEL_{SEL}$ ($IGL_{SEL_k}$) is calculated for each channel k (step 1224), where:

$$FGL_{SEL_k} = \frac{\sum_{i=1}^{N} w_{i,k} IGL_{i,k}}{\sum_{i=1}^{N} w_{i,k}} \qquad (EQ. 14)$$

Thus, the final estimate value of $PIXEL_{SEL}$ is based upon a contribution of each of the calculated intermediate estimate values for each channel of each line segment relative to their respective weights. To illustrate this, if for example the line segments are those shown in FIG. 14, then intermediate estimate values for $PIXEL_{SEL}$ are calculated for line segments V and D1 because all other line segments were removed at step 1204. But, since line segment D1 has a lower mean square fitting error than line segment V, the intermediate estimate value for line segment D1 contributes significantly more to the final estimate value of $PIXEL_{SEL}$ than the intermediate estimate value for line segment V. Once the estimation of values for $PIXEL_{SEL}$ is completed (step 1216) then processing goes to step 1112 in FIG. 9.

Referring back to FIG. 9, once estimated values for $PIXEL_{SEL}$ are calculated, then at step 1112 they are stored in the corrected image area of memory 14. A check is then made at step 1114 to determine whether the end of the source image has been reached. In other words, have all pixels in the source image been scanned by the window operator. If not, then the "no" branch is taken to step 1115 where the window operator is advanced, and set, preferably centered, to the next pixel in the image and steps 1107–1114 are repeated as previously described.

Figure 2C:
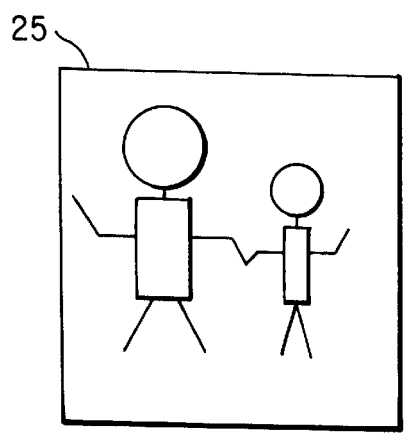
FIG. 2(c) is a pictorial view of a corrected digital image after correction of the defect pixels in the digital image in FIG. 2(a)

Once the end of image is reached, the "yes" branch is taken from step 1114 to step 1116, where the corrected image stored in memory 14 is output to the image output device 24 at step 1116 and the end of the process at step 1118. An example of the corrected image is shown in FIG. 2(c), wherein the defect 1026 has been corrected and is no longer visually discernible.

In two alternative embodiments, the size of each line segment at step 1202 in FIGS. 10 and 11 is variable along its respective radial line through $PIXEL_{SEL}$. Thus, step 1200 for setting the line segment size is no longer needed. Line segments are extended on both sides of $PIXEL_{SEL}$. The composition of each line segment is determined by extending each line segment along a vector (i.e., its respective radial line) from each side of $PIXEL_{SEL}$ as described below.

In the first alternative embodiment, line segments are separately extended on each opposite side of $PIXEL_{SEL}$ on a vector along its respective radial line until each side is composed of a certain number of non-defect pixels, ND, (not shown or described with respect to FIGS. 10 and 11). Preferably, ND represents two or three non-defect pixels. If a line segment cannot be extended on either side of $PIXEL_{SEL}$ to include ND non-defect pixels, then that line segment is not included in SET. This can occur because the line segment extension reached the outer edge of the source image (or defect map) or a maximum distance from $PIXEL_{SEL}$ without locating ND non-defect pixels. Once both sides of any line segment include ND non-defect pixels, it is assured that the line segment has a proper number of non-defect pixels for subsequent processing.

Figure 12A:
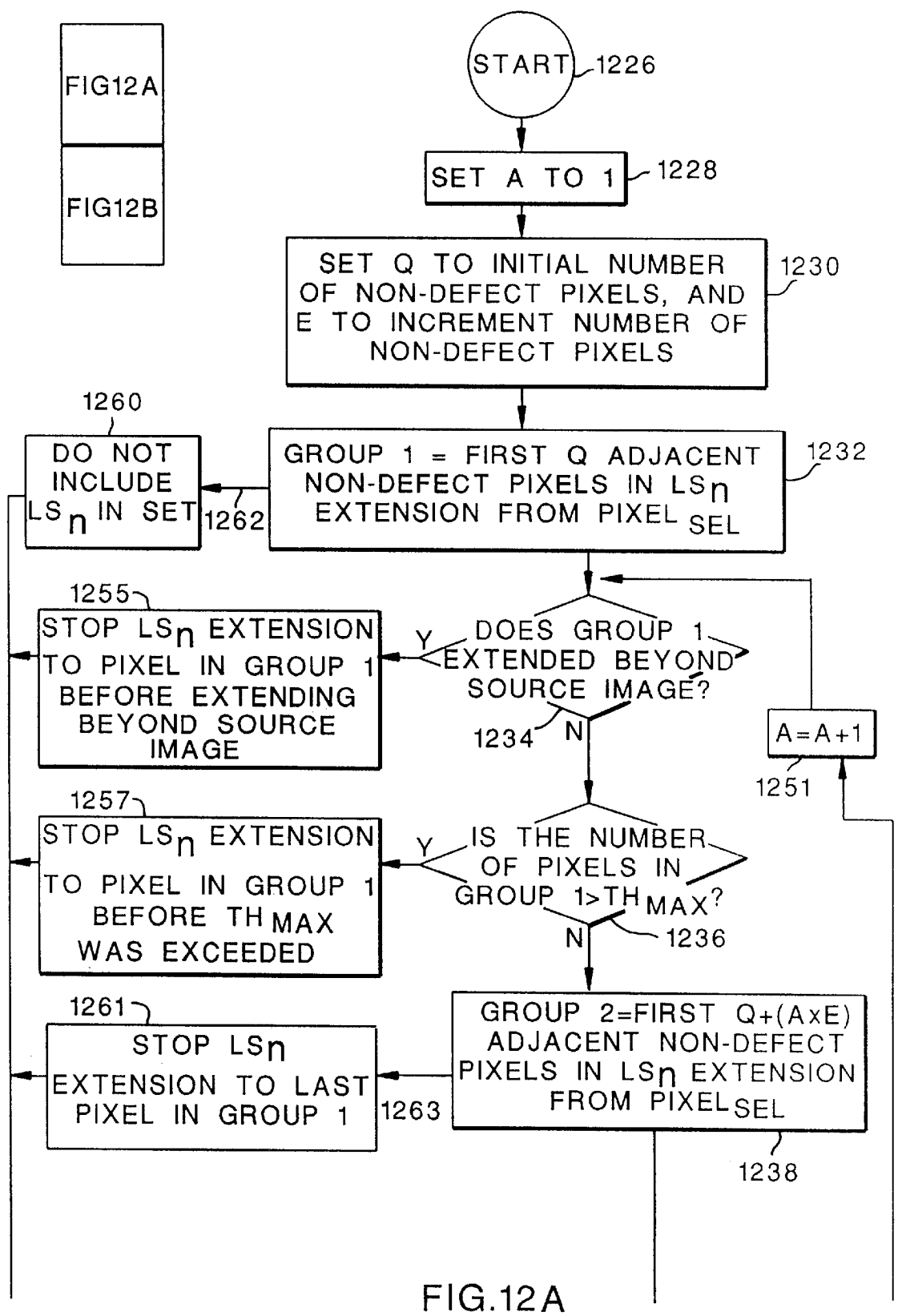
FIG. 12 is a flow chart illustrating an alternative embodiment in the standard pinwheel method for defining the line segments in the process for estimating corrected values for a defect pixel in FIGS. 10 and 11.
Figure 12B:
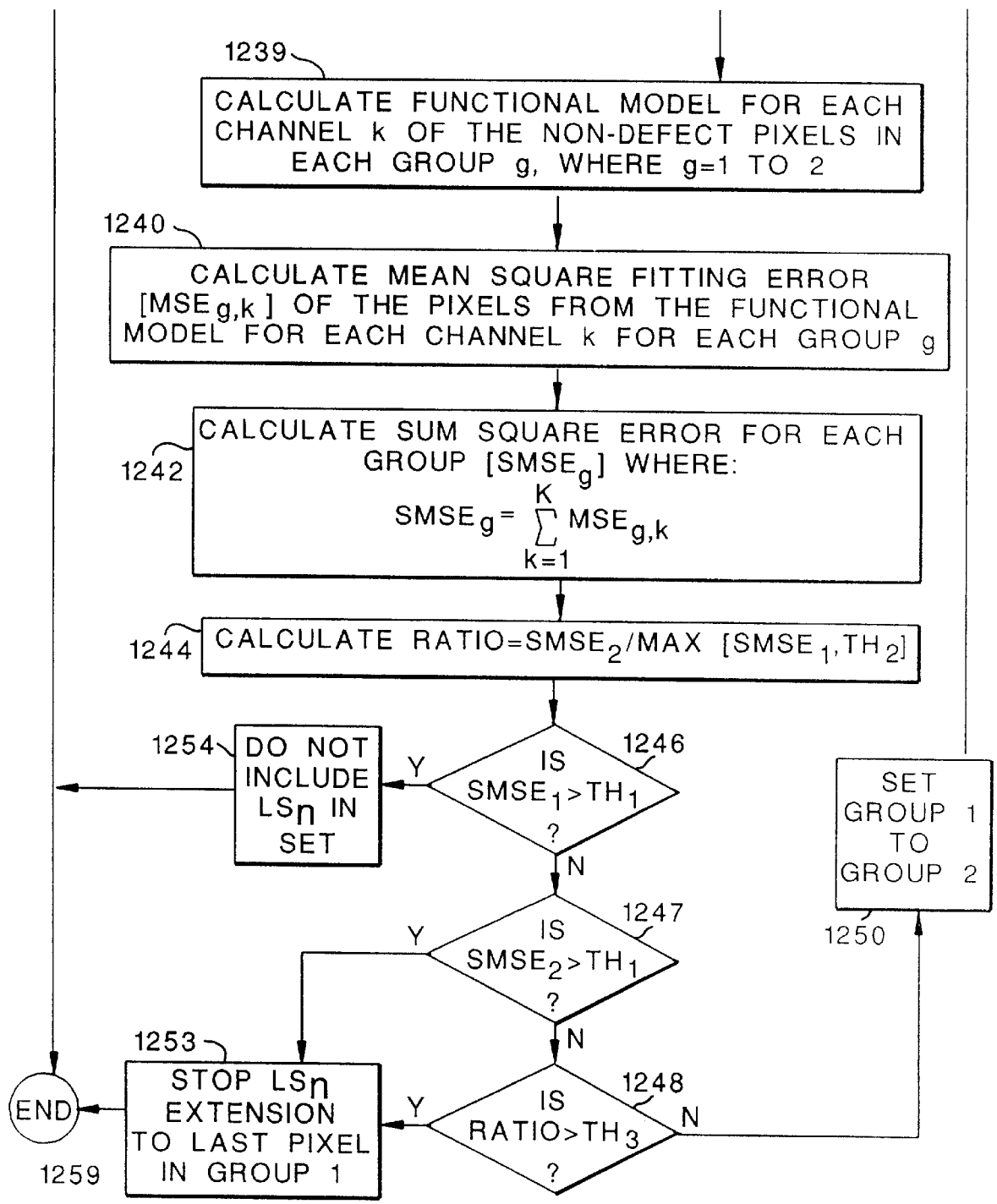
Figure 13:
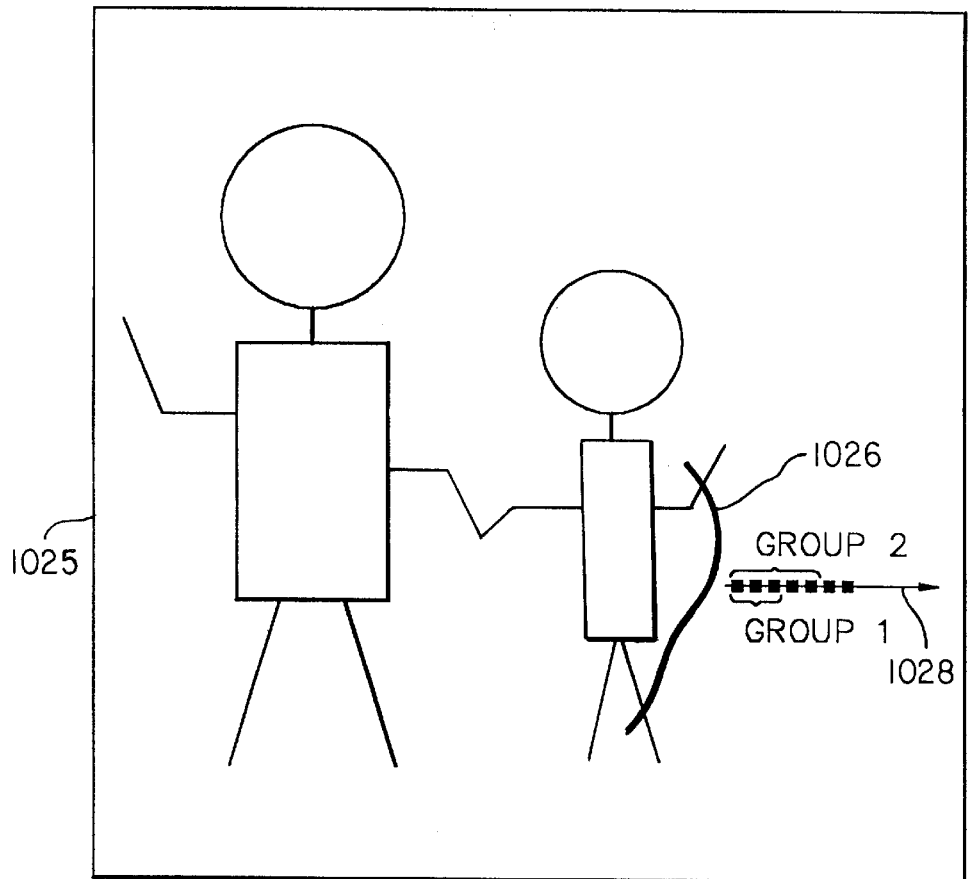
FIG. 13 is a pictorial view of the digital image of FIG. 2(a) illustrating a line segment being defined as described in FIG. 12.

Referring to FIGS. 12 and 13, the second alternative embodiment will now be discussed. FIG. 12 is a flow chart describing the extension of one side of line segment $LS_n$ from $PIXEL_{SEL}$. Starting at step 1226, multiplier A is first set to 1 (step 1228). Variable Q is then set to a desired initial number of non-defect pixels from $PIXEL_{SEL}$, and variable E to a desired increment number of non-defect pixels (step 1230). Next, the first Q adjacent non-defect pixels for the line segment $LS_n$ extension from $PIXEL_{SEL}$ is set as Group 1 along a vector corresponding to line segment $LS_n$ radial line (step 1232). A series of stopping conditions for extending line segment $LS_n$ are then checked. First, if Group 1 cannot be established either due to the lack of Q adjacent non-defect pixels or that the edge of the source image (or defect map) was reached, then path 1262 from step 1232 is followed to step 1260 where line segment $LS_n$ is not included in SET. A check 1234 is performed to test if Group 1 extends beyond the source image and, if it does, extension is stopped (step 1255). Next a check is performed to determine whether the number of pixels in Group 1 exceeds a maximum threshold of line segment non-defect pixels $TH_{MAX}$ (step 1236). If so, then the "yes" branch is taken to step 1257 where the line segment $LS_n$ extension stops at the pixel in Group 1 before $TH_{MAX}$ was exceeded. $TH_{MAX}$ represents the maximum number of non-defect pixels any one side of $PIXEL_{SEL}$ may be composed of.

If the number of pixels in Group 1 does not exceed $TH_{MAX}$, then the "no" branch is taken to step 1238 where the first Q+(A*E) adjacent non-defect pixels from $PIXEL_{SEL}$ along the same vector as Group 1 is set as Group 2. If Group 2 cannot be established either due to a lack of Q+(A*E) adjacent non-defect pixels, or that the edge of the source image (or defect map) was reached, then path 1263 is taken to step 1261 where line segment $LS_n$ extension stops at the last pixel in Group 1. Q represents a base number of non-defect pixels in line segment $LS_n$, and E represents the number of successive non-defect pixels added to that base number in each iteration of the extension process, as will be shown below.

FIG. 13 illustrates an example of extending line segment $LS_n$ along a vector 1028 from $PIXEL_{SEL}$ in defect region 1026 of source image 1025. The black dots along vector 1028 in FIG. 13 represent adjacent non-defect pixels from $PIXEL_{SEL}$ (not drawn to scale). In this example, Q equals 3 and E equals 2. Thus, Group 1 comprises the first three adjacent non-defect pixels closest the $PIXEL_{SEL}$, and Group 2 comprises five non-defect pixels, i.e., the three non-defect pixels in Group 1 and the next two adjacent non-defect pixels from $PIXEL_{SEL}$ after the non-defect pixels of Group 1.

Next, a functional model is calculated (1238) for each channel k of the pixels in each group. Then, at step 1240 a mean square fitting error ($MSE_{g,k}$) is calculated for each channel k of their non-defect pixels from their model, where g=1 and 2, representing Group 1 and Group 2 respectively. Functional model and MSE calculations were described earlier in reference to FIG. 10. Next, the MSE's for each channel of each group are summed to provide a sum mean square error value ($SMSE_g$) for each group g (step 1242), where:

$$SMSE_g = \sum_{k=1}^{K} MSE_{g,k} \qquad (EQ. 15)$$

In the preferred embodiment $SMSE_g$ is calculated only when necessary i.e. the $SMSE_2$ is stored as $SMSE_1$ for the next extension step.

Next, a RATIO is calculated for the sum mean square errors of Group 2 to Group 1, RATIO=$SMSE_2$/Max [$SMSE_1$, $TH_2$], where $TH_2$ is greater than 0 and the Max function selects the greater of the two terms $SMSE_1$, and $TH_2$ (step 1244).

The next three checks are based upon $SMSE_1$, $SMSE_2$ and RATIO. The first check is performed only once at the beginning of the extension process when A=1. The first check is whether the sum mean square error calculated for Group 1, SMSE$_1$, is greater than a first threshold, TH$_1$ (step 1246). If so, then the "yes" branch is taken to step 1254 where line segment LS$_n$ is not included in SET. The second check is whether the sum mean square error of Group 2, SMSE$_2$, is greater than the first threshold, TH$_1$ (step 1247). The third check is whether RATIO is greater than a third threshold, TH$_3$ (step 1248). These three thresholds TH$_1$, TH$_2$, and TH$_3$ are empirically determined such that the more statistically consistent the values of the non-defect pixels are within each group to their model, the further line segment LS$_n$ will extend from PIXEL$_{SEL}$. Preferably, these thresholds are selected to provide that TH$_1$ is greater than TH$_2$, and TH$_3$ is greater than 1. If all three checks at steps 1246, 1247, and 1248 are false, then their "no" branches are taken to step 1250 where the Group 1 pixels are replaced with the pixels of Group 2. Then, A is indexed by one (step 1251) and steps 1236–1248 are repeated as previously described, wherein Group 2 now includes the next E adjacent non-defect pixels from PIXEL$_{SEL}$ in addition to the pixels of Group 1. Using FIG. 13 as an example, Group 1 now has five non-defect pixels from PIXEL$_{SEL}$ and Group 2 has seven non-defect pixels from PIXEL$_{SEL}$ along vector 1028. If either the second check (step 1247) or third check (step 1248) is true, then their "yes" branch is taken to step 1253 where the line segment LS$_n$ extension stops at the last non-defect pixel furthest from PIXEL$_{SEL}$ in Group 1. Groups 1 and 2 will continue to be expanded in the above manner until at least one stopping condition is satisfied, leading to end 1259.

Once the extension of one side of line segment LS$_n$ from PIXEL$_{SEL}$ is completed, without an indication of non-inclusion in SET, the above process is repeated for the other side of line segment LS$_n$. In this manner, the total composition of defect and non-defect pixels for each side of line segment LS$_n$ is determined or fixed. The above is repeated for each line segment through PIXEL$_{SEL}$. Finally, the SET of line segments defined at step 1202 comprises the line segments which are extended on both sides of PIXEL$_{SEL}$ without a non-inclusion indication.

Of the above two alternative embodiment, the second embodiment is preferred because it employs statistical analysis of non-defect pixel values (e.g., SMSE) in extending line segments, rather than a constant number of non-defect pixels ND. Further, in the second embodiment, those skilled in the art can appreciate other types of stopping conditions may also be used than those described to provide different line segment extension criteria.

Preferably in this apparatus, once non-defect pixels have been estimated and stored in the corrected image (steps 1110 and 1112 in FIG. 9), their estimated corrected values are not used in subsequent correction of other non-defect pixels in the source image. However, where after a single scan of the source image defect pixels remain uncorrected, corrected pixel values alternatively can be used in a second scan for correcting defect pixels. This may be required where the defect region is very large, or the defect region lies near the boundaries of the source image.

The preceding examples are set forth to illustrate specific embodiments of this invention and are not intended to limit the scope of the invention. It will be understood that variations and modifications can be effected within the spirit and scope of the invention.

Parts List

10—Computer System
12—Processor
14—Memory
16—Internal Bus
18—Hard Disk
20—Image Reader
22—Interface
24—Output Device
25—Source Image
26—Defect Region
102—Edge Detection Step
104—Edge Manipulation Step
106—Correction Step
402–1259—Steps
1025—Source Image Example
1026—Defect Example
1028—Vector
1098–1261—Steps
1262–1263—Paths
A0–A15—Areas
E0–E15—Areas

We claim:

1. A method for correcting one or more defect pixels in a defect region of a source image, which image has both the defect pixels and non-defect pixels each of which is represented by at least one defect pixel signal and non-defect pixel signal, respectively, the method comprising:

a) searching for edges in a non-defect region of the image adjacent to the defect region by: (i) comparing relative pixel parameters in the non-defect region with a predetermined tolerance to locate in the non-defect region a series of adjacent pixels representing an edge segment the members of which have relative parameters within the tolerance and which series is within a predetermined distance of the defect region; and (ii) comparing the of the edge segment within a minimum length to identify as an edge a segment with a least the minimum length;

b) generating at least one pixel sign for the defect region based on the signal of at least one non-defect pixel lying in a direction from the defect pixel which is determined by the direction of an edge; and c) replacing the defect pixel signal with the generated pixel signal.

2. A method according to claim 1 wherein the pixel parameters of the detected edge include parameters which define edge shape.

3. A method according to claim 1 wherein pixel parameters are compared by first generating a gradient field for the non-defect region and wherein the relative pixel parameters compared are relative gradient attributes.

4. A method according to claim 1 wherein the searching for edge segments is repeated in each of a plurality of local non-defect regions which are adjacent to and around the same defect region.

5. A method according to claim 1 wherein, if at least two edges are identified:

(i) the difference in pixel parameters of the ends of the edges adjacent to the defect region are compared with a predetermined tolerance; and (ii) pixel signals are generated for defect region pixels lying on a line connecting the two ends which meet the foregoing tolerance, which signals are based on at least one pixel signal of the two detected edges.

6. A method according to claim 5 wherein the line connecting the two ends is a straight line.

7. A method according to claim 5 wherein a parameter representative of pixel signals in a region adjacent to at least a first side of one edge is compared with the parameter representative of pixel signals in a region adjacent to a corresponding first side of the other edge, and pixel signals for the defect region are generated between the two ends based on at least one pixel signal of the two detected edges only if the difference in those parameters are within a predetermined tolerance.

8. A method according to claim 7 wherein a parameter representative of pixel signals in a region adjacent to a second side of a detected edge are compared with the parameter representative of pixel signals in a region adjacent to a corresponding second side of another detected edge, and pixel signals for the defect region are generated between the two ends based on at least one pixel signal of the two detected edges only if the difference in the first side parameters and the difference in the second side parameters are both within a predetermined tolerance.

9. A method according to claim 5 wherein a line connecting the two ends is modeled based on the shape of the two edges.

10. A method according to claim 1 additionally comprising:

comparing the distance between a defect region pixel and a detected edge, with a threshold;

for a defect region pixel not within the threshold, generating a pixel signal by:

allocating a plurality of line segments through the defect pixel, wherein each said line segment is composed of the defect pixel and the non-defect pixels about said selected defect pixel;

determining at least one representative model of the non-defect pixel signals along each said line segment;

determining the deviation of the non-defect pixel signals along each said line segment from the model corresponding to the line segment;

selecting the line segment having the lowest deviation which does not intersect a detected edge; and determining corrected pixel signals for said selected defect pixel based on at least one of the non-defect pixel signals in said selected line segment.

11. A method according to claim 1 additionally comprising scanning an image.

12. A method of claim 1 additionally comprising determining an edge direction prior to step (b).

13. A method of correcting one or more defect pixels in a defect region of a source image, which image has both the defect pixels and non-defect pixels each of which is represented by at least one defect pixel signal and non-defect pixel signal, respectively, the method comprising:

a) searching for edges in a non-defect region of the image adjacent to the defect region by: (i) generating a gradient field for the non-defect region; (ii) comparing gradients of the pixels to locate a start pixel in the non-defect region which has a gradient magnitude exceeding a preselected threshold; (iii) comparing at least relative directional gradient attributes in the non-defect region with a predetermined tolerance to locate in the non-defect region series of adjacent pixels each series representing an edge segment, each series extending in at least one direction from the start pixel, the members of which have at least relative directional gradient attributes within the predetermined tolerance and which series is within a predetermined distance of the defect region; (iv) comparing the length of the edge segments with a minimum length to identify as edges those edge segments with at least the minimum length;

b) if at least two edges are found, comparing their relative directions and magnitudes with predetermined tolerances;

c) generating pixel signals for the defect region between respective ends of two edges which have relative directions and magnitudes within the predetermined tolerances, which signals are based on at least one pixel signal of the two edges; and d) replacing defect pixel signals with the generated pixel signals.

14. A method according to claim 13 wherein the non-defect region which is searched for edges is comprised of a plurality of local non-defect regions disposed about the defect region, each local non-defect region being searched in turn for an edge, and wherein the start pixel for each local non-defect region is the pixel with the highest gradient magnitude in that local image area.

15. A method of correcting one or more defect pixels in a defect region of a source image, which image has both the defect pixels and non-defect pixels each of which is represented by at least one defect pixel signal and non-defect pixel signal, respectively, the method comprising:

a) searching a non-defect region of the image adjacent to the defect region to locate in the non-defect region series of adjacent pixels each series representing an edge segment, and comparing the length of each segment with a predetermined minimum length to locate as edges those segments of at least the minimum length;

b) searching for a geometric primitive by comparing at least one geometric parameter of a set of the edges with a geometric constraint corresponding to a geometric primitive, a geometric primitive being detected when the set at least meets the geometric constraint;

c) generating pixel signals for defect region pixels each based on the signal of at least one non-defect pixel lying on a predictor line having a direction which has been-determined by the direction of at least one part of a detected geometric primitive; and d) replacing defect pixel signals with the generated pixel signals.

16. A method according to claim 15 wherein each series of adjacent pixels representing edge segments is detected by: (i) generating a gradient field for the non-defect region; (ii) comparing at least one relative gradient attribute of pixels in the non-defect region with at least one predetermined tolerance to locate a series of adjacent pixels the members of which have at least one relative gradient attribute within the predetermined tolerance.

17. A method according to claim 16 wherein gradient magnitudes of the pixels are first compared to locate a start pixel in the non-defect region which has a gradient magnitude exceeding a preselected threshold, and the series of adjacent pixels is located which extends in at least one direction from the start pixel.

18. A method according to claim 16 wherein the geometric primitive is composed of straight line segment edges.

19. A method according to claim 15 wherein, for at least two edges of the set which meets the geometric constraint, a parameter representative of pixel signals in a region adjacent to at least a first side of one edge of the set is compared with the parameter representative of pixel signals in a region adjacent to a corresponding first side of the other edge of the set, a geometric primitive being detected only if the difference in those parameters is within a predetermined tolerance.

20. A method according to claim 19 wherein a parameter representing pixel signals in a region adjacent to a second side of one edge of the set is compared with the parameter representing pixel signals in a region adjacent to a corresponding second side of the other edge of the set, a geometric primitive being detected only if the difference in the first side parameters and the difference in the second side parameters are both within predetermined tolerances.

21. A method according to claim 20 wherein the parameter representing pixel signals compared in the regions adjacent to the sides are average signals.

22. A method according to claim 19 wherein the parameter representing pixel signals compared in the regions adjacent to the sides are average signals.

23. A method according to claim 15 additionally comprising, for a defect region pixel:
   allocating a plurality of line segments through the defect pixel, wherein each said line segment is composed of the defect pixel and non-defect pixels about said selected defect pixel;
   if there is at least one line segment with a minimum number of non-defect pixels on either side of the defect pixel then comparing the distance between the defect pixel and the nearest part of a detected primitive, with a threshold distance;
   if the distance is beyond the threshold distance, then:
      determining at least one representative model of the non-defect pixel signals along each said line segment;
      determining the deviation of the non-defect pixel signals along each said line segment from the model corresponding to the line segment;
      selecting the line segment having the lowest deviation which does not intersect an part of a detected primitive; and
      determining corrected pixel signals for said selected defect pixel based on at least one of the non-defect pixel signals in said selected line segment.

24. A method according to claim 23 wherein, if there is no line segment with the minimum number of non-defect pixels on either side of the defect pixel, or the distance between the defect pixel and the nearest part, in the map, of a detected primitive is within the threshold, then a corrected pixel signal for the defect pixel is determined based on the signal of at least one non-defect pixel lying on a predictor line through the defect pixel having a direction determined by the direction of a neighboring part of at least one detected geometric primitive in the edge map.

25. A method according to claim 15 wherein the geometric parameter is the intersection angle of two edges in the map, and the geometric constraint is a range of intersection angles of two edges.

26. A method according to claim 15 wherein: the locations of the edges together define an edge map and wherein, prior to generating pixel signals, a detected geometric primitive is extracted by extending or reducing, in the map, one or more edges of the detected primitive so that they intersect in the same pattern as the primitive, or by replacing in the map the edges detected as a primitive with one or more new edges representing the primitive.

27. A method according to claim 26 wherein a signal for a defect pixel is generated based on the signal of at least one non-defect pixel lying on a predictor line extending through the defect pixel and having a direction determined by the direction of a neighboring part of a detected geometric primitive in the edge map.

28. A method according to claim 27 wherein the predictor line is parallel to the neighboring part.

29. A method according to claim 26 additionally comprising:
   comparing the distance between a defect region pixel and the nearest part of a detected primitive in the edge map, with a threshold distance;
   for a defect region pixel beyond the threshold distance, generating a pixel signal by:
   allocating a plurality of line segments through the defect pixel, wherein each said line segment is composed of the defect pixel and the non-defect pixels about said selected defect pixel;
   determining at least one representative model of the non-defect pixel signals along each said line segment;
   determining the deviation of the non-defect pixel signals along each said line segment from the model corresponding to the line segment;
   selecting the line segment having the lowest deviation which does not intersect a part, in the map, of a detected primitive; and
   determining corrected pixel signals for said selected defect pixel based on at least one of the non-defect pixel signals in said selected line segment.

30. A method according to claim 26 wherein, prior to searching for a geometric primitive:
   (i) for at least one edge intersecting the defect region, the direction of a defect part of that edge is determined based on the direction of the edge;
   (ii) searching a non-defect region of the image adjacent to the defect region for a series of adjacent pixels in the non-defect region representing an edge segment extending from a first non-defect pixel intersected by the defect part of the edge, and comparing the length of such a series with a predetermined minimum length to locate as a defect exit part of the edge a series of at least the minimum length; and
   (iii) when a defect exit part is located, the at least one edge, its corresponding defect part and defect exit part are added to the edge map as a connected edge, or when a defect exit part is not located the edge and its defect part are added to the edge map as a not connected edge.

31. A method according to claim 30 wherein the series of adjacent pixels representing edge segments are detected by: (i) generating a gradient field for the non-defect region; (ii) comparing gradient magnitudes of the pixels to locate a start pixel in the non-defect region which has a gradient magnitude exceeding a preselected threshold; (iii) comparing at least one relative gradient attribute of pixels in the non-defect region with at least one predetermined tolerance to locate a series of adjacent pixels the members of which have at least one relative gradient attribute within the predetermined tolerance.

32. A method according to claim 15 wherein the digital image signal represents a scanned image.

33. A method of correcting one or more defect pixels in a defect region of a source image, which image has both the defect pixels and non-defect pixels each of which is represented by at least one defect pixel signal and non-defect pixel signal, respectively, the method comprising:
   a) searching a non-defect region of the image adjacent to the defect region for sequences of pixels representing edge segments, and comparing the length of each segment with a predetermined minimum length to locate as edges those segments of at least the minimum length the locations of the edges together defining an edge map;

b) searching for a geometric primitive by comparing at least one geometric parameter of a set of edges with a geometric constraint corresponding to a geometric primitive, a geometric primitive being detected when the set at least meets the geometric constraint;

c) generating pixel signals for defect region pixels each based on the signal of at least one non-defect pixel lying on a predictor line having a direction determined by the direction of at least one part of a detected geometric primitive; and d) replacing defect pixel signals with the generated pixel signals;

wherein, prior to searching for a geometric primitive:

(i) for at least one edge intersecting the defect region, the direction of a defect part of that edge is determined based on the direction of the edge;

(ii) searching a non-defect region of the image adjacent to the defect region for a sequence of adjacent pixels in the non-defect region representing an edge segment extending from a first non-defect pixel intersected by the defect part of the edge, and comparing the length of such a sequence with a predetermined minimum length to locate as a defect exit part of the edge a sequence of at least the minimum length; and (iii) when a defect exit part is located, the at least one edge, its corresponding defect part and defect exit part are added to the edge map as a connected edge, or when a defect exit part is not located the edge and its defect part are added to the edge map as a not connected edge;

and wherein, prior to searching for a geometric primitive, an edge thinning is performed on the edges in the edge map by:

(i) locating a set of matched edges, where edges match when they are within a predetermined angle tolerance and distance of a selected one of the edges of the set;

(ii) selecting the best edge of the set which is the strongest connected edge, if any, or if none, is the strongest not connected edge of the set, where the strength of the edge is defined by the average gradient magnitude of the pixels of the edge, and deleting the remainder of the edges of the set from the edge map.

34. A method according to claim 33 wherein, following edge thinning, in searching for a geometric primitive all intersecting edges which are not part of any geometric primitive, are removed from the edge map.

35. A method according to claim 34 wherein edge thinning is performed on all edges in the edge map, and next searching for a geometric primitive is performed until all edges have been processed.

36. A method of correcting one or more defect pixels in a defect region of a source image, which image has both the defect pixels and non-defect pixels each of which is represented by at least one defect pixel signal and non-defect pixel signal, respectively, the method comprising:

a) searching a non-defect region of the image adjacent to the defect region for sequences of pixels representing edge segments, and comparing the length of each segment with a predetermined minimum length to locate as edges those segments of at least the minimum length;

b) searching for a geometric primitive by comparing at least one geometric parameter of a set of the edges with a geometric constraint corresponding to a geometric primitive, a geometric primitive being detected when the set at least meets the geometric constraint;

c) generating pixel signals for defect region pixels each based on the signal of at least one non-defect pixel lying on a predictor line having a direction determined by the direction of at least one part of a detected geometric primitive; and d) replacing defect pixel signals with the generated pixel signals;

wherein the locations of the edges together define an edge map and wherein, prior to generating pixel signals, a detected geometric primitive is extracted by extending or reducing, in the map, one or more edges of the detected primitive so that they intersect in the same pattern as the primitive, or by replacing in the map the edges detected as a primitive with one or more new edges representing the primitive;

and wherein the signal generated for a defect pixel within a predetermined distance of a plurality of neighboring parts of a detected geometric primitive in the edge map is determined by:

first determining estimated pixel signals for the defect pixel based on at least one non-defect pixel lying on each of the predictor lines passing through the defect pixel, and then determining a final pixel signal which is a weighted sum of estimated pixel signals, each estimated pixel signal being weighted in an inverse relationship to the distance between the predictor line and the corresponding geometric primitive part.

37. An apparatus for correcting one or more defect pixels in a defect region of a source image, which image has both the defect pixels and non-defect pixels each of which is represented by at least one defect pixel signal and non-defect pixel signal, respectively, the apparatus comprising a programmed computer with a memory for storing the source image, the programmed computer having:

a) means for searching for edges in a non-defect region of the image adjacent to the defect region by: (i) comparing relative pixel parameters in the non-defect region with a predetermined tolerance to locate in the non-defect region a series of adjacent pixels representing an edge segment the members of which have relative parameters within the tolerance and which series is within a predetermined distance of the defect region; and (ii) comparing the length of an edge segment with a minimum length to identify as an edge a segment with at least the minimum length;

b) means for generating at least one pixel signal for the defect region based on the signal of at least one non-defect pixel lying in a direction from the defect pixel which is determined by the direction of the edge; and c) means for replacing a defect pixel signal with the generated pixel signal.

38. An apparatus for correcting one or more defect pixels in a defect region of a source image, which image has both the defect pixels and non-defect pixels each of which is represented by at least one defect pixel signal and non-defect pixel signal, respectively, comprising a programmed computer with a memory for storing the source image, the programmed computer having:

a) means for searching a non-defect region of the image adjacent to the defect region to locate in the non-defect region series of adjacent pixels each series representing an edge segment, and comparing the length of each segment with a predetermined minimum length to locate as edges those segments of at least the minimum length;

b) means for searching for a geometric primitive by comparing at least one geometric parameter of a set of edges with a geometric constraint corresponding to a geometric primitive, a geometric primitive being detected when the set at least meets the geometric constraint;

c) means for generating pixel signals for defect region pixels each based on the signal of at least one non-defect pixel lying on a predictor line having the direction determined by the direction of at least one edge of a detected geometric primitive; and d) means for replacing defect pixel signals with the generated pixel signals.

39. A computer program product, comprising a computer readable storage medium including program means for correcting one or more defect pixels in a defect region of a source image, which image has both the defect pixels and non-defect pixels each of which is represented by at least one defect pixel signal and non-defect pixel signal, respectively, the program means comprising:

a) means for searching for edges in a non-defect region of the image adjacent to the defect region by: (i) comparing relative pixel parameters in the non-defect region with a predetermined tolerance to locate in the non-defect region a series of adjacent pixels representing an edge segment the members of which have relative parameters within the tolerance and which series is within a predetermined distance of the defect region; and (ii) comparing the length of an edge segment with a minimum length to identify as an edge a segment with at least the minimum length;

b) means for generating at least one pixel signal for the defect region based on the signal of at least one non-defect pixel lying in a direction from the defect pixel which is determined by the direction of the edge; and c) means for replacing the defect pixel signal with the generated pixel signal.

40. A computer program product, comprising a computer readable storage medium with program means for correcting one or more defect pixels in a defect region of a source image, which image has both the defect pixels and non-defect pixels each of which is represented by at least one defect pixel signal and non-defect pixel signal, respectively, the program means comprising:

a) means for searching a non-defect region of the image adjacent to the defect region to locate in the non-defect region series of adjacent pixels each representing an edge segment, and comparing the length of each segment with a predetermined minimum length to locate as edges those segments of at least the minimum length;

b) means for searching for a geometric primitive by comparing at least one geometric parameter of a set of edges with a geometric constraint corresponding to a geometric primitive, a geometric primitive being detected when the set at least meets the geometric constraint;

c) means for generating pixel signals for defect region pixels each based on the signal of at least one non-defect pixel lying on a predictor line having a direction determined by the direction of at least one edge of a detected geometric primitive; and d) means for replacing defect pixels signal with the generated pixel signals.

41. A method of correcting at least one defect pixel in a defect region of a source image, which image has both the defect pixel and non-defect pixels each of which is represented by at least one defect pixel signal and non-defect pixel signal, respectively, the method comprising:

allocating a plurality of line segments through a selected defect pixel, wherein each said line segment is composed of the defect pixel and non-defect pixels about said selected defect pixel;

determining at least one representative model of the non-defect pixel signals along each said line segment;

determining the deviation of the non-defect pixel signals along each said line segment from the model corresponding to the line segment;

determining at least one dominant direction of the local gradient field;

selecting at least one line segment based on a figure of merit;

calculating an estimated pixel signal for the defect pixel based on at least one non-defect pixel for each selected line segment;

generating a final pixel signal which is a weighted sum of estimated pixel signals with weights proportional to figures of merit of the selected line segments, wherein the figure of merit is a value which increases with decreased deviation of the non-defect pixels along the selected line segment, and increases with the alignment of the line segment with the dominant directions of the local gradient field and replacing the defect pixel signal with the generated pixel signal.

* * * * *